US012716022B2

(12) United States Patent
Vidma et al.

(10) Patent No.: US 12,716,022 B2
(45) Date of Patent: Aug. 25, 2026

(54) METHOD FOR SINGLE-STAGE TREATMENT OF SILICEOUS SUBTERRANEAN FORMATIONS

(71) Applicant: SCHLUMBERGER TECHNOLOGY CORPORATION, Sugar Land, TX (US)

(72) Inventors: Konstantin Viktorovich Vidma, Sugar Land, TX (US); Haiyan Zhao, Sugar Land, TX (US); Murtaza Ziauddin, Sugar Land, TX (US); Patrice Abivin, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/099,137

(22) PCT Filed: Jul. 31, 2023

(86) PCT No.: PCT/US2023/029075
§ 371 (c)(1),
(2) Date: Jan. 28, 2025

(87) PCT Pub. No.: WO2024/026137
PCT Pub. Date: Feb. 1, 2024

(65) Prior Publication Data

US 2026/0042956 A1 Feb. 12, 2026

Related U.S. Application Data

(60) Provisional application No. 63/379,183, filed on Oct. 12, 2022, provisional application No. 63/369,801, filed on Jul. 29, 2022.

(51) Int. Cl.
*C09K 8/74* (2006.01)
*C09K 8/528* (2006.01)
(Continued)

(52) U.S. Cl.
CPC ................ *C09K 8/74* (2013.01); *C09K 8/528* (2013.01); *E21B 37/06* (2013.01); *E21B 43/27* (2020.05); *C09K 2208/30* (2013.01)

(58) Field of Classification Search
CPC ... C09K 8/52; C09K 8/72; C09K 8/74; C09K 8/528; C09K 2208/30; E21B 37/06; E21B 43/27
See application file for complete search history.

(56) References Cited

U.S. PATENT DOCUMENTS 4,330,419 A 5/1982 Hall
4,848,467 A 7/1989 Cantu
(Continued)

FOREIGN PATENT DOCUMENTS

CA 2530325 C 3/2009
WO 2015012753 A1 1/2015
WO 2022204339 A1 9/2022

OTHER PUBLICATIONS

Search Report and Written Opinion of International Patent Application No. PCT/US2022/021630 dated Juy 1, 2022, 10 pages.
(Continued)

*Primary Examiner* — Zakiya W Bates
(74) *Attorney, Agent, or Firm* — Jeffrey D. Frantz

(57) ABSTRACT

Compositions, methods, and workflows for treating a siliceous geologic formation including flowing a treatment composition into the formation, wherein the treatment composition has a pH of about −1.0 to about 6.0 and includes an acid having molecular weight less than about 200 or an ammonium or sodium salt thereof, an HF source, and a precipitation prevention agent, and a transient modifier, and allowing the transient modifier to modify the permeability of the siliceous formation. The precipitation prevention agent may comprise a chelant or a scale inhibitor. The transient
(Continued)

modifier may comprise surfactant, viscoelastic surfactant, a solid, hydrophobic material, an emulsion, a gas, or an energized fluid.

20 Claims, 19 Drawing Sheets

(51) Int. Cl.
*E21B 37/06* (2006.01)
*E21B 43/22* (2006.01)
*E21B 43/27* (2006.01)

(56) References Cited

U.S. PATENT DOCUMENTS 4,957,165 A 9/1990 Cantu
4,986,355 A 1/1991 Casad
5,096,618 A 3/1992 Frenier
5,529,125 A 6/1996 Di Lullo Arias
5,979,557 A 11/1999 Card
5,993,558 A 11/1999 Webster, Jr.
6,435,277 B1 8/2002 Qu
6,703,352 B2 3/2004 Dahayanake
6,949,491 B2 9/2005 Cooke, Jr.
7,036,587 B2 5/2006 Munoz, Jr.
7,059,414 B2 6/2006 Rae
7,115,546 B2 10/2006 Qu
7,119,050 B2 10/2006 Chang
7,144,844 B2 12/2006 Qu
7,182,136 B2 2/2007 Dalrymple
7,192,908 B2 3/2007 Frenier
7,219,731 B2 5/2007 Sullivan
7,220,709 B1 5/2007 Qu
7,237,608 B2 7/2007 Fu
7,265,079 B2 9/2007 Willberg
7,267,170 B2 9/2007 Mang
7,299,870 B2 11/2007 Garcia-Lopez de Victoria
7,350,572 B2 4/2008 Fredd
7,380,600 B2 6/2008 Willberg
7,380,602 B2 6/2008 Brady
7,482,311 B2 1/2009 Willberg
7,506,689 B2 3/2009 Surjaatmadja
7,510,009 B2 3/2009 Cawiezel
7,550,413 B2 6/2009 Huang
7,565,929 B2 7/2009 Bustos
7,575,054 B2 8/2009 Fuller
7,582,311 B1 9/2009 Cleland
7,666,821 B2 2/2010 Fu
7,775,278 B2 8/2010 Willberg
7,934,556 B2 5/2011 Clark
8,016,034 B2 9/2011 Glasbergen
8,109,335 B2 2/2012 Luo
8,167,043 B2 5/2012 Willberg
8,220,543 B2 7/2012 Clark
8,312,929 B2 11/2012 Frenier
8,316,941 B2 11/2012 Frenier
8,618,026 B2 12/2013 Ezell
8,646,529 B2 2/2014 Clark
8,714,249 B1 5/2014 Tang
8,720,556 B2 5/2014 Todd
8,726,991 B2 5/2014 Boney
8,887,803 B2 11/2014 East, Jr.
8,905,133 B2 12/2014 Potapenko
8,936,086 B2 1/2015 Liang
8,973,659 B2 3/2015 Karadkar
9,022,112 B2 5/2015 Chaabouni
9,034,806 B2 5/2015 Gurmen
9,135,475 B2 9/2015 Lecerf
9,322,260 B2 4/2016 Potapenko
9,376,888 B2 6/2016 Tang
9,556,720 B2 1/2017 Onda
9,580,642 B2 2/2017 Brannon
9,593,565 B2 3/2017 Lecerf
9,657,557 B2 5/2017 Bugrin
9,663,706 B2 5/2017 Fu
9,670,399 B2 6/2017 Reyes
9,919,966 B2 3/2018 Gupta
9,920,610 B2 3/2018 Nelson
9,938,811 B2 4/2018 Bestaoui-Spurr
10,030,471 B2 7/2018 Lecerf
10,041,327 B2 8/2018 Nelson
10,280,362 B2 5/2019 Purdy
10,301,903 B2 5/2019 Payne
10,329,476 B2 6/2019 Purdy
10,590,336 B2 3/2020 Purdy
10,738,237 B2 8/2020 Beuterbaugh
10,753,001 B2 8/2020 Purdy
10,822,535 B2 11/2020 Purdy
10,947,123 B2 3/2021 Purdy
10,982,133 B2 4/2021 Purdy
11,098,241 B2 8/2021 Purdy
11,168,246 B2 11/2021 Purdy
11,370,961 B2 6/2022 Purdy
11,447,692 B2 9/2022 Purdy
11,708,526 B2 7/2023 Al-Harbi
12,270,288 B2 * 4/2025 Zhao ...................... E21B 43/27
2003/0134751 A1 7/2003 Lee
2004/0177960 A1 9/2004 Chan
2004/0254079 A1 12/2004 Frenier
2005/0016731 A1 1/2005 Rae
2006/0102349 A1 5/2006 Brady
2007/0235189 A1 10/2007 Milne
2008/0139412 A1 6/2008 Fuller
2008/0146465 A1 6/2008 Fu
2009/0025933 A1 1/2009 Garcia-Lopez de Victoria
2009/0042748 A1 2/2009 Fuller
2009/0075844 A1 3/2009 Ke
2009/0233819 A1 9/2009 Fuller
2010/0230106 A1 9/2010 Milne
2013/0079260 A1 3/2013 Frenier
2013/0228336 A1 9/2013 Droger
2013/0233558 A1 9/2013 Fu
2015/0083417 A1 3/2015 Lant
2016/0264849 A1 9/2016 Oliveira
2016/0272879 A1 9/2016 Reddy
2018/0347332 A1 12/2018 Bestaoui-Spurr
2019/0345807 A1 11/2019 Purdy
2020/0165511 A1 5/2020 Nino-Penaloza
2020/0263080 A1 8/2020 Purdy
2020/0317516 A1 10/2020 Purdy
2020/0318009 A1 10/2020 Purdy
2021/0189226 A1 6/2021 Purdy
2021/0189855 A1 6/2021 Purdy
2021/0198561 A1 7/2021 Purdy
2021/0230476 A1 7/2021 Purdy
2021/0388265 A1 12/2021 Purdy
2022/0049156 A1 2/2022 Purdy
2022/0089938 A1 3/2022 Purdy
2022/0267178 A1 8/2022 Purdy
2024/0101891 A1 3/2024 Vidma

OTHER PUBLICATIONS

Office Action issued in U.S. Appl. No. 18/552,296 dated Jun. 10, 2024, 18 pages.
Search Report and Written Opinion of International Patent Application No. PCT/US2023/029075 dated Nov. 15, 2023, 9 pages.
Nelson, P. H., "Pore-throat sizes in sandstones, tight sandstones, and shales", AAPG Bulletin, 2009, 93(3), pp. 329-340.
Gidley, J. L., "Acidizing Sandstone Formations: A Detailed Examination of Recent Experience", SPE 14164, presented at the 60th Annual Technical Conference and Exhibition of the Society of Petroleum Engineers, held in Las Vegas, NV, 1985, 11 pages.
McLeod et al., "Sandstone Acidizing", Reservoir Stimulation Book, Section 18-8, pp. 1-28.
Kashif, M. et al., "Pore Size Distribution, Their Geometry and connectivity in deeply buried Paleogene Es1 sandstone reservoir, Nanpu Sag, East China", Petroleum Science, 2019, 16, pp. 981-1000.
Office Action issued in U.S. Appl. No. 18/505,445 dated Sep. 4, 2024, 14 pages.

(56) References Cited

OTHER PUBLICATIONS

Search Report and Written Opinion issued in the PCT Application No. PCT/US2024/055025 dated Feb. 21, 2025, 11 pages.

* cited by examiner (Prior Art)

Figure 1. Prior Art HF Systems

Embodiment 1
VES-based flexible particles
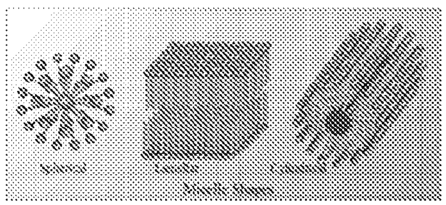
Embodiment 2
Dispersion of hydrophobic droplets
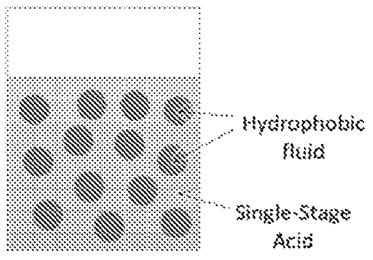
Embodiment 3
Suspension of acid in a hydrophobic fluid
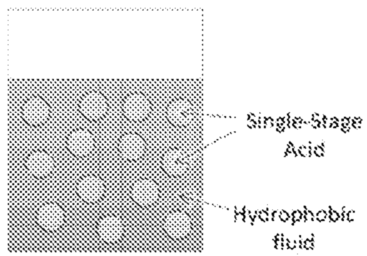
Embodiment 4
Single-stage acid-based foam
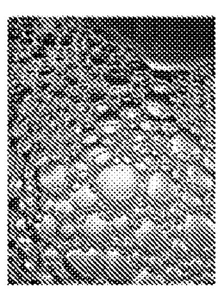
Figures 6A, 6B, 6C, and 6D Viscosity data vs. time room temperature Viscosity data vs. time at high temperature

| Temperature, DegF [DegC] | Surfactant concentration, galUS/1,000 galUS or L/m3 | Dispersion stability time (hours) for various temperature and Acid/Solvent Ratios | | |
|---|---|---|---|---|
| | | 90:10 | 80:20 | 70:30 |
| 150 [66] | 15 | 3+ | <1 | <0.25 |
| | 30 | | 3+ | <1 |
| 175 [79] | 15 | <1 | <0.25 | <0.25 |
| | 30 | | <0.5 | <0.25 |

Figure 12.

| Surfactant concentration, galUS/1,000 galUS or $L/m^3$ | Half—Life at room temperature, min |
|---|---|
| Fluid: 15% HCl with 0.5% of corrosion inhibitor | |
| 5 | 8.6 |
| 7.5 | 8.8 |
| 10 | 9.3 |
| Fluid: 15% HCl spent with $CaCl_2$ (pH=2) | |
| 5 | 16.1 |
| 7.5 | 17.3 |
| 10 | 16.0 |

Figure 16.

METHOD FOR SINGLE-STAGE TREATMENT OF SILICEOUS SUBTERRANEAN FORMATIONS

CROSS-REFERENCE TO RELATED APPLICATIONS

This application is a National Stage Entry of International (PCT) Application No. PCT/US2023/029075, filed Jul. 31, 2023, which claims priority to and the benefit of U.S. Provisional Patent Application Ser. No. 63/379,183, filed on Oct. 12, 2022, and U.S. Provisional Patent Application Ser. No. 63/369,801 filed Jul. 29, 2022. Both applications are incorporated by reference herein in their entirety.

FIELD

This disclosure relates to stimulation of hydrocarbon-containing siliceous subterranean formations. Specifically, methods of transient rock permeability modification in the midst of acid treatment of such formations are described herein.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these elements are to be read in this light, and not as an admission of any kind.

Wellbores are drilled into subsurface rocks to access fluids, such as hydrocarbons, stored in subterranean formations. Then, subterranean fluids can be produced from these wells. Acidic fluids are injected into the wellbore to stimulate the formation and improve the likelihood of extraction of hydrocarbons. The acid modifies some mineral structures in the formation to improve the likelihood of hydrocarbon flow. In the particular case of sandstone formations, which contain siliceous minerals, hydrogen fluoride (HF) is used in many forms to dissolve the silica and aluminosilicate materials.

Acidic fluids are routinely injected into sandstone formations using a multiple fluid, multiple process step regime including spacers and conditioning steps. Unfortunately, HF is not compatible with other minerals, such as carbonates and some feldspars, in the formation. For example, calcium ions from carbonates or feldspars can precipitate as calcium fluoride, among other things. Operators employ methods to prevent calcium from precipitating during these treatments. One method is to treat the formation with a calcium-removing fluid prior to the acid treatment such as hydrochloric, formic, or acetic acid. The calcium-removing fluid dissolves calcium compounds in the formation, and when the fluid is removed, the calcium is removed or greatly reduced such that contact with additional acid results in, at most, only slight precipitation of calcium that does not hamper fluid conductivity.

Similarly, other ions such as magnesium, sodium, potassium, aluminum, and silicates present in various sandstone minerals, may also cause precipitation with HF based fluids (for example, $MgF_2$, $Na_2SiF_6$, $K_2SiF_6$, $AlF_x$, and $Si(OH)_4$ respectively), and conventional techniques involve various acid or brine pre-treatments to remove enough of these ions prior to contact with HF based fluid to limit formation damage. Acid sensitive clays may also precipitate.

Sandstone acidizing includes injecting a fluid that dissolves material residing in the interpore space such as clay or feldspar and etches the surface of sandstone grains. This is a delicate chemical process that has a risk of secondary precipitation of various components. In order to minimize secondary precipitation, sandstone acidizing requires either multistage treatment to prevent mixing of incompatible ions or pumping of a complex single-stage acid mix with the function of controlling reprecipitation. Often such fluid is pumped into a long or heterogeneous interval.

Further, sandstone pore throat dimension distribution has a wide range, and can be present within the same interval. In various sandstone reservoirs, the throat size may span from single-digit microns to hundreds of microns. Pore throat size may vary from 0.001 micrometer (μm) to 100 μm. Such a range of pore throat sizes corresponds to the range of permeability from 1 nDarcy to 10 Darcy.

The Prior Art example of FIG. 1 requires 3 cycles if the wellbore has 3 zones (BCD) with significant gradient in permeabilities. Note that the low-perm zone will be treated last and that may be the zone of highest interest (most damaged). Consider a 5-cycle treatment separated by a diverter as illustrated by the Prior Art workflow of FIG. 1.

- Brine preflush is needed to displace reservoir fluids (high salinity water) that may be incompatible with the treatment fluid. This represents approximately 20 percent of the treatment.
- The acid preflush (HCl) is used to dissolve as much as possible of the carbonate in the formation ahead of the main treatment because the main acid treatment is not compatible with carbonate minerals. This represents approximately 25 percent of the treatment.
- The main acid treatment is based on HF and will dissolve clays. This is the main treatment designed to restore permeability of the matrix to its original state (prior to damage). This represents approximately 25 percent of the treatment.
- The post-flush is usually brine and is used to displace the reacted fluid away from the critical first feet around the wellbore. The objective is to prevent secondary precipitations from occurring around the wellbore. This represents approximately 25 percent of the treatment.

Diverter stage may be conducted with or without a spacer and is a small stage in terms of fluid volume. This represents approximately 5 percent of the treatment.

These methods suffer from the primary problem that the pre-treatment is not always precisely co-extensive with the acid treatment. Because the acid dissolves minerals, the acid can reach parts of the formation that were not exposed to a calcium-removing fluid, resulting in calcium precipitation. Additionally, multiple stages of treatment use large volumes of treatment fluids. Methods are needed to prevent calcium precipitation during acid-treatment of hydrocarbon-containing siliceous formations. Also, reducing stages of treatment would reduce volume of treatment materials. Elegance and speed are valuable, indeed, when engaging in sandstone acidizing.

SUMMARY

A summary of certain embodiments described herein is set forth below. It should be understood that these aspects are presented merely to provide the reader with a brief summary of these certain embodiments and that these aspects are not intended to limit the scope of this disclosure.

Embodiments described herein provide compositions, methods, and workflows for treating a siliceous geologic formation including flowing a treatment composition into the formation, wherein the treatment has a pH of about −1.0 to about 6.0 and includes an acid having a molecular weight less than about 200 or an ammonium or sodium salt thereof, an HF source, a precipitation prevention agent, and a transient modifier, and allowing the transient modifier to modify the permeability of the siliceous formation. The precipitation prevention agent may comprise a chelant or a scale inhibitor. The transient modifier may comprise a surfactant, a viscoelastic surfactant, a solid, a hydrophobic material, an emulsion, a gas, or an energized fluid. In some embodiments, the transient modifier comprises polylactic acid.

In some embodiments, the scale inhibitor is a phosphonic acid, a phosphoric acid, a phosphonate, a phosphate, a polyacrylamide, a phosphonated polyetheramine, a salt of an acrylamido-methyl propane sulfonate/acrylic acid copolymer, phosphinated maleic copolymer, a salt of a polymaleic acid/acrylic acid/acrylamido-methyl propane sulfonate terpolymer, or a mixture thereof. Some embodiments may benefit from adjusting the pH of the composition using a mineral acid.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Certain embodiments of the disclosure will hereafter be described with reference to the drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

FIGS. 6A, 6B, 6C, and 6D are a series of sectional views and renderings of dimensional features of some transient permeability modifier embodiments.

FIG. 12 is a chart of dispersion stability time as a function of temperature and surfactant concentration.

FIG. 16 is a chart of foam stability, that is, half life observations, as a function of surfactant concentration of fluids with a listed composition.

DETAILED DESCRIPTION

Figure 1:
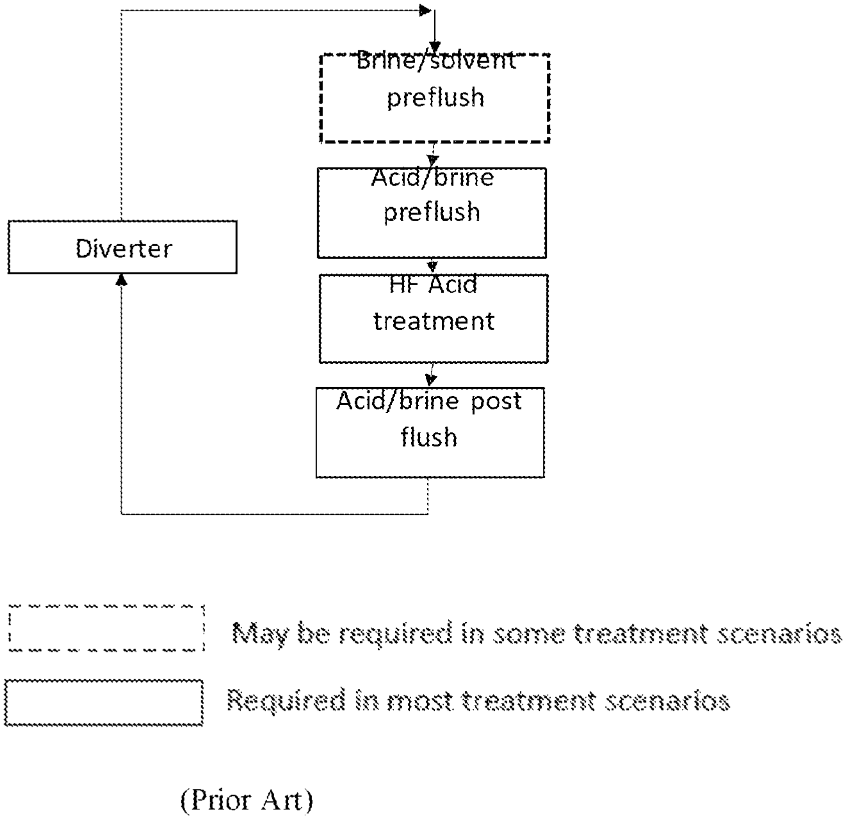
FIG. 1 (Prior Art) is a workflow schematic of an acidizing system for sandstone.

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

Methods of treating a hydrocarbon formation to enhance recovery of hydrocarbons from the formation are described herein. The methods herein comprise treating the formation with a low pH acid solution, also known as a treatment composition or an aqueous treatment, containing a precipitation prevention agent. The precipitation prevention agent may comprise a chelant or a scale inhibitor. In some embodiments, the aqueous treatment may comprise an emulsion and the external phase would be a hydrocarbon. The fluoride scale inhibitor interrupts crystallization of fluoride deposits resulting from reaction of the acid solution with formation materials. The acid solution contains hydrogen fluoride (HF), hydrofluoric acid, and/or a source thereof, to dissolve and/or remove clay and other siliceous materials that can reduce fluid flow within the formation. Some embodiments include an acid having molecular weight less than about 200 or an ammonium or sodium salt thereof. Other acids, such as hydrochloric acid or other mineral acids and organic acids can also be added to bring the acidity of the solution to a target or into a target range. The treatment fluids described herein have a pH of, or adjusted to, about −1.0 to about 6.0, such as about 1.5 to about 2.5, for example about 2.0. The treatment methods and compositions described herein can be used effectively without the need for an acid preflush in most cases. Herein, we use a method of self-diversion of single-stage acidizing fluid in such intervals, which combines the diverter and the acid fluid in one step.

The treatment fluids described herein can be used, in some cases, to perform an acid treatment of a sandstone formation using only one stage of treatment. Because the use of the precipitation prevention agent reduces the formation of fluoride scales in the formation during the acid treatment, the single stage treatment can be effective in removing calcium, aluminum, and silicon debris from the formation without creating diversions that can reduce the effectiveness of the acid treatment. Single-stage acid treatment of sandstone formations reduces the time to perform the treatment and reduces the volume of treatment fluid used for the treatment. Reduced volume of treatment fluid also reduces the volume of any flowback fluid handling. In one embodiment of treatment, the acid preflush and diverter stages are eliminated so that there is around 30% cut in pumped volume and pumping time. There may be some adjustments in preflush and postflush, but it is more difficult to quantify.

Some commercially available single-stage sandstone acidizing products from Schlumberger Technology Corporation of Sugar Land, Texas can dissolve the interpore space of a sandstone while controlling re-precipitation. Those products are: OneSTEP, OneSTEP GP, and a single-stage acidizing fluid. The formulation and methods of pumping the latter may include the methods and compositions described in Patent Cooperation Treaty Application Number PCT/US2022/021630 filed on Mar. 21, 2022 entitled, "Method for Single Stage Treatment of Silicious Subterranean Formations," which is incorporated by reference herein in its entirety.

The treatment fluid typically contains HF, or a source thereof such as ammonium bifluoride, and may contain other acids to bring the pH to a target or within a target range. Acids used herein are typically simple acids, and/or salts thereof, having a molar mass of about 200 Daltons or less. The acids can be organic and/or inorganic, and the organic acids can be substituted with halogen atoms such as fluorine, chlorine, bromine, and iodine. Examples include HCl, formic acid, acetic acid, chloroacetic acid, citric acid, phosphoric acid, perchloric acid, nitric acid, hydroiodic acid, iodic acid, uric acid, sulfonic acid, lactic acid, glycolic acid, glyceric acid, sulfamic acid, methylsulfamic acid, tartaric acid, succinic acid, fumaric acid, butyric acid, valeric acid, isovaleric acid, oxalic acid, malic acid, maleic acid. Substituted versions, for example isomers or versions of the above acids having heteroatoms such as sulfur, nitrogen, phosphorus, silicon, and the like, for example amino acids or acid amides, or other acid derivatives of any of the listed acids can also be used. Ammonium, sodium, or lithium salts thereof can also be included.

The precipitation prevention agent may comprise a chelant or a scale inhibitor. The chelant may be present in the fluid at about 40.0 weight percent or less of the treatment composition. The fluoride scale inhibitors herein inhibit the formation of metal ion-containing precipitation, such as calcium, aluminum, magnesium, ferric, etc., particularly fluoride precipitates. In sandstone acid treatment, calcium fluoride is the major precipitation causing damage when calcium-containing materials exist in the formation. The scale inhibitors herein prevent the formation of calcium fluoride precipitate and then eliminate the potential damage to the formation. The efficacy of the scale inhibitors depends on the amount of scale inhibitor used and formation conditions (temperature, composition). The scale inhibitor is used at a concentration of 0.01 to 2 percentage by weight in the treatment fluid. In some embodiments, the scale inhibitor is about 0.1 weight percent to about 5.0 weight percent of the treatment composition. These scale inhibitors work to limit precipitation in the pH range of about 1.0 to about 3.0, such as about 1.5 to 2.5, for example about 2.0. Outside that pH range, the precipitation limiting function of the scale inhibitors is diminished.

The scale inhibitors used herein are a phosphonic acid, a phosphoric acid, a phosphonate, a phosphate, a polyacrylamide, a phosphonated polyetheramine, a salt of an acrylamido-methyl propane sulfonate/acrylic acid copolymer (AMPS/AA), phosphinated maleic copolymer (PHOS/MA), a salt of a polymaleic acid/acrylic acid/acrylamido-methyl propane sulfonate terpolymer (PMA/AMPS), organophosphonates and derivatives thereof, including hydroxyethylidene diphosphonic acid (HEDP) or salts thereof, 2-phosphonobutane-1,2,4-tricarboxylic acid (PBTC) or salts thereof, amino trimethylene phosphonic acid (ATMP) or salts thereof, diethylene triamine penta (methylene phosphonic acid) (DTPMPA) or salts thereof, 2-hydroxy phosphonoacetic acid (HPAA) or salts thereof, polyamino polyether methylene phosphonic acid (PAPEMP), bis(hexamethylene triamine penta (methylene phosphonic acid)) (BHMTPMP) or salts thereof, hydroxyethylamino-di(methylene phosphonic acid) (HEMPA) or salts thereof, ethylene diamine tetra (methylene phosphonic acid) (EDTMIPA) or salts thereof, hexamethylenediaminetetra (methylenephosphonic Acid) (HMDTMPA) or salts thereof, phosphonated polyetheramine, a phosphate ester, or a mixture of any of the listed materials. Salts can be ammonium salts, sodium salts, lithium salts, or mixtures thereof.

The treatment fluids herein can include other ingredients, such as Brønsted acids, corrosion inhibitors, mutual solvents, clay control agents, wetting agents, iron control agents, chelating agents, and fluid loss additives. Diversion control materials, such as ball sealers and particulate materials, can also be added to the treatment fluid. Particulate materials that can be included in the treatment fluid include polymers and copolymers of lactide, glycolide, amide, phosphate, and mixtures thereof, polyethyleneterephthalate (PET); polybutyleneterephthalate (PBT); polyethylenenaphthalenate (PEN); partially hydrolyzed polyvinyl acetate; polyacrylamide, polymethacrylamide and derivatives, combinations, or mixtures thereof, any of which may be degradable or soluble. Chelants that can be used include maleic acid, tartaric acid, citric acid, nitrilotriacetic acid, hydroxyethyliminodiacetic acid, hydroxyethylethylenediaminetetraacetic acid, ethylenediaminetetraacetic acid, cyclohexylenediaminetetraacetic acid, diethylenetriaminepentaacetic acid, ammonium salts thereof, lithium salts thereof, sodium salts thereof, and mixtures thereof.

Other additives that can be used include fluoride binding agents, such as boric acid and aluminum chloride, inhibitors for precipitation of fluorosilicate and fluoroaluminate salts, and surfactants, which may be viscoelastic surfactants and/or other surfactants. Other additives that can be used include permanent clay stabilizers, non-emulsifiers, corrosion inhibitors, friction reducers, iron control agents, diverting agents, or fluid-loss control agents. These additives can be used alone or in any combination in the treatment fluids described herein.

Often fluid is pumped into a long or heterogeneous interval. To achieve good coverage of such a reservoir, some sort of diversion is typically needed. That is, a transient permeability modifier, also known as a transient modifier will be selected. Embodiments herein relate to the method of self-diversion of single-stage acidizing fluid in such intervals. The method includes adding particulates to the single-stage sandstone acidizing acid to create a homogeneous mixture. When pumped into the formation such mixture would penetrate the formation, and particulates would gradually accumulate in the interpore space or on the formation face thus causing additional resistance and diverting fluid to the harder-to-access portions of the interval. Eventually good coverage of a heterogeneous interval can be achieved in a single run. The accumulated particles degrade or dissolve eventually and don't leave any residue in the formation.

Some embodiments inject the acid fluids followed by diverter products. The diverter can block the high-permeability zone temporarily. In the next stage, the acid fluids are expected to flow into the lower-permeability zone. If there are more zones to be treated, the same procedures can be repeated in a multiple-stage job.

Figure 2:
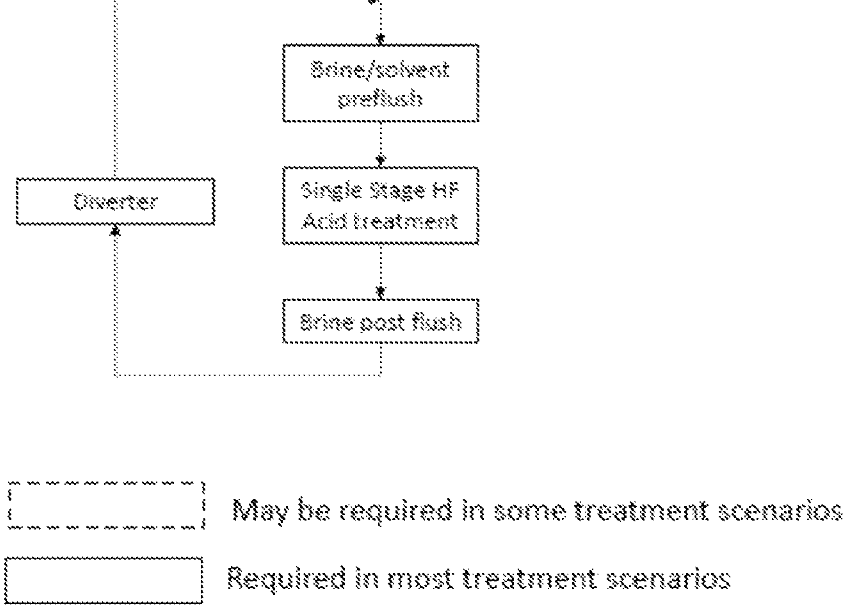
FIG. 2 is a workflow schematic for one embodiment of an invention described herein using a single stage HF acid system.
Figure 3:
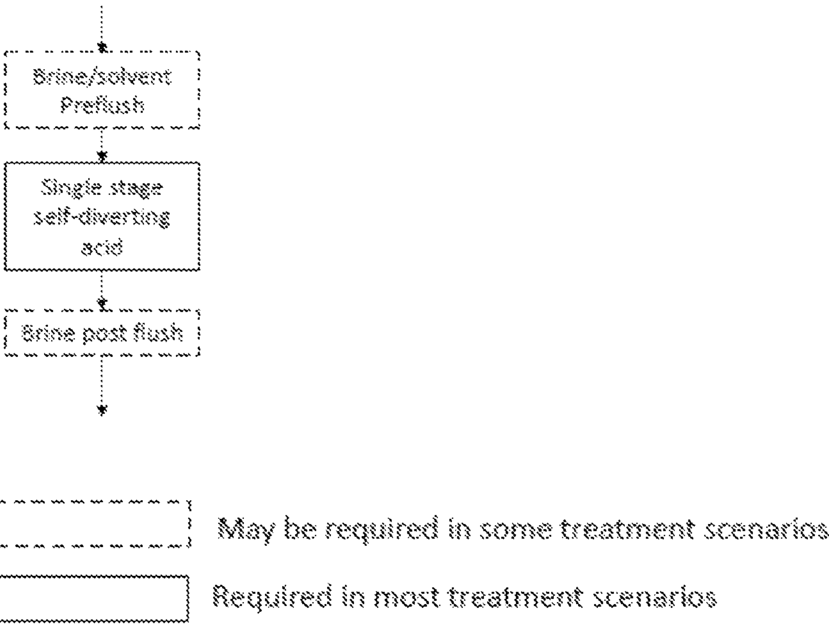
FIG. 3 is a workflow schematic for one embodiment of an invention described herein using a self-diverting single stage HF acid system.

In the prior art example of FIG. 1, one would technically need 3 cycles if there are 3 zones (BCD) with significant gradient in permeabilities. Note that the low-perm zone will be treated last and that may be the zone of highest interest (most damaged). FIG. 2 shows one workflow for one embodiment using a single stage HF acid system. FIG. 3 shows one workflow for one embodiment using a self-diverting single stage HF acid system. That is, in contrast, in the system of FIG. 3, a self-accumulating particulate system would generate the diversion and fluid moves appropriately. In some embodiments of FIG. 3, the preflush may be optional, too.

Figure 4:
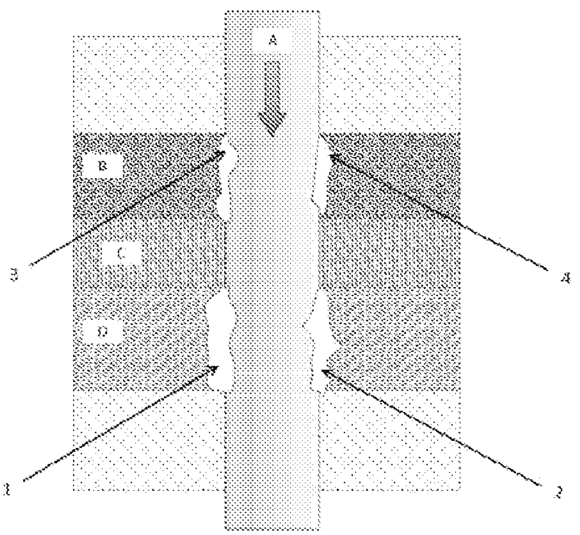
FIG. 4 is a sectional view of a siliceous formation traversed by a wellbore with multiple regions of sandstone, varied permeability regions, and particulate agglomeration.

FIG. 4 provides a cross sectional view of a subterranean formation that may benefit from some embodiments of the invention. For example, particulate-laden fluid is pumped through an open-hole wellbore A to treat the subterranean formation having three zones of interest B, C, D with different permeabilities, with permeability of D being the highest, then—permeability of B, then—C: $k_D>k_B>k_C$. Treatment fluid first flows predominantly to the formation D. Particulates invade the formation interpore space and/or accumulate on the formation face (objects 1 and 2 on the figure) gradually building additional resistance and diverting the flow to the zone B. Subsequently in the zone B particulates invade the formation interpore space and/or accumulate on the formation face (objects 3 and 4 on FIG. 4), thus diverting the flow to the zone C.

One approach is to inject the acid fluids followed by diverter products. The diverter can block the high-permeability zone temporarily. In the next stage the acid fluids are expected to flow into the lower-permeability zone. If there are more zones to be treated, the same procedures can be repeated in multiple-stage job. Homogeneous mix can be pumped as acidizing fluid during the entire job or can be pumped as a portion of acidizing treatment. It can be split on several or many slugs with acid or other fluid in between. In one embodiment, the particulates are made of polylactic acid and have a median size in the range of 1-50 μm with at least 90% of particulates being within the range from 0.3 to 500 μm. In another embodiment, the particulates are made of butanediol-vinyl alcohol copolymer and have a median size of 5-1000 μm with at least 90% of particulates have a size within 1-1000 μm.

Homogeneous mix can be pumped as acidizing fluid during the entire job or can be pumped as a portion of acidizing treatment. It can be split into several or many slugs with acid or other fluid in between. The homogeneous mix of particulates and single-stage acid can be pumped through coiled tubing.

A homogeneous mix can be pumped in some embodiments as acidizing fluid during the entire job or can be pumped as a portion of acidizing treatment. It can be split into several or many slugs with acid or other fluid in between.

Figure 5:
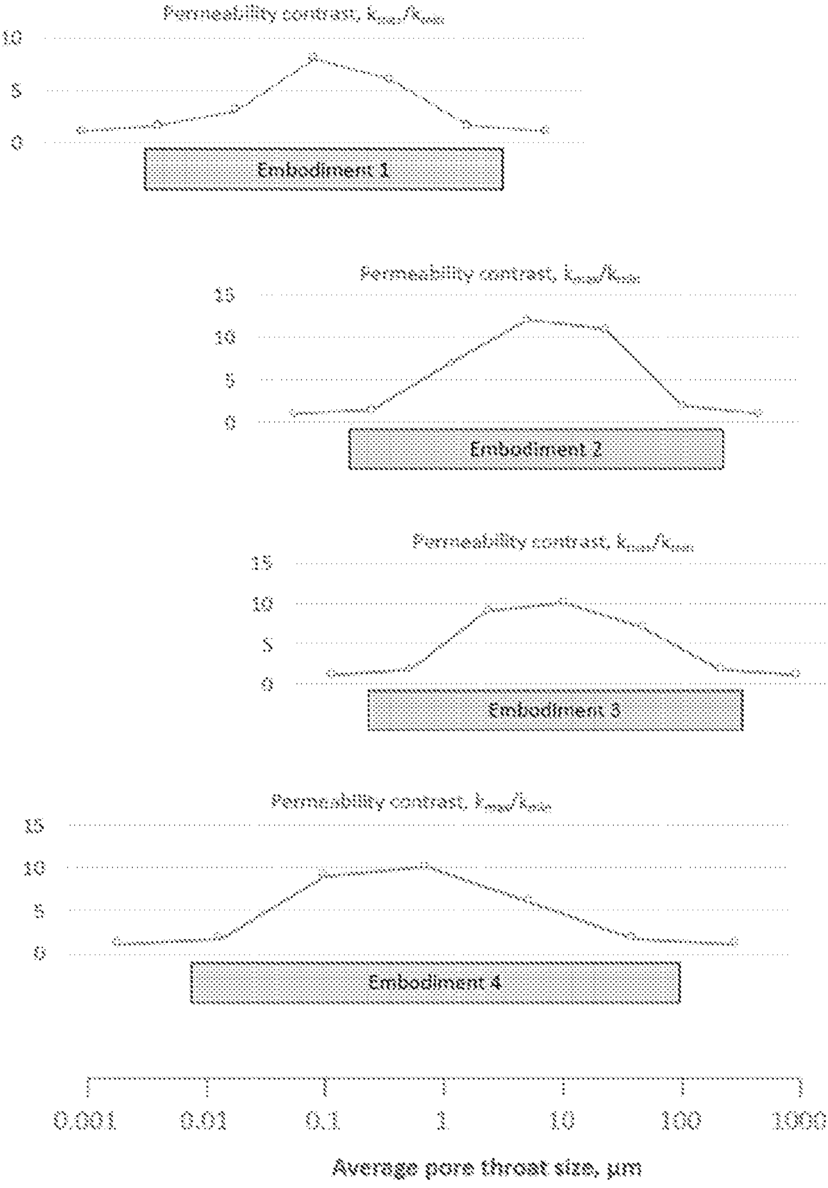
FIG. 5 is a series of plots of permeability contrast as a function of pore throat size for several embodiments.

Tailoring diversion for the sandstone at hand, selecting a transient modifier, varies with the sandstone pore size variability, the heterogeneity of the rock surfaces, chemical compositions of the formation materials, formation temperature and pressure, wellsite location, and a host of other factors. Herein we use the term degradable material to encompass a variety of transient permeability modifiers that may agglomerate on the rock face, increase viscosity in a region to such an extent that fluid no longer flows or is reduced into the surrounding rock, invade the pore throat of the sandstone matrix to inhibit flow, or some combination thereof. The transient nature of the degradable material matters; over time, it should degrade, dissolve, dilute, or otherwise evolve to refrain from its originally intended diversion role. Surfactants, emulsions, dispersions of multiphase materials, energized fluids, solids suspended in viscous materials, or combinations thereof may be tailored based on the circumstances including compatibility with the acid, pH, scale inhibitor, formation temperature and pressure, and desired pressure drop in a particular formation region. FIG. 5 compares applicability ranges for four embodiments with permeability contrast $K_{max}/K_{min}$ over a logarithmic average pore throat size. Chart 1 provides some compositional considerations.

CHART 1

| System | Degradable material | Suspending agent |
|---|---|---|
| VES (Embodiment 1) | Micelle | Aqueous |
| Dispersion (Embodiment 2) | Oil | Aqueous |
| Emulsion (Embodiment 3) | Aqueous | Oil |
| Foam (Embodiment 4) | Gas | Aqueous |
| Suspension (Embodiment 5) | Solid | Aqueous |
| In-situ version of Embodiment 2 | Oil | Aqueous |
| In-situ version of Embodiment 3 | Aqueous | Oil |
| In-situ version of Embodiment 4 | Gas | Aqueous |
| In-situ version of Embodiment 5 | Solid | Aqueous |

Embodiments herein relate to treating a sandstone formation with acidizing fluid. Herein, some embodiments use a method of self-diversion of single-stage acidizing fluid in such intervals, which combines the transient permeability modifier, the diverter and the acid fluid in one step. A method includes adding of particulates to the single-stage sandstone acidizing acid to create a homogeneous mixture. Particulate concentration may exist within the range of 0.5-500 ppt. When pumped into the formation such mixture would penetrate the formation, and particulates would gradually accumulate in the interpore space or on the formation face thus causing additional resistance and diverting fluid to the harder-to-access portions of the interval. Eventually good coverage of a large portion of heterogeneous interval can be achieved in a single run (FIG. 4).

Embodiments herein are applicable to sandstone formations with initial permeability in the range of 1 mD-2000 mD and permeability contrast from 1.1 to 100 and bottomhole temperature of 70-400° F. In some embodiments, the formation permeability ranges from 10 mD to 500 mD. In some embodiments, the formation permeability contrast ranges from 1.1 to 10. In some embodiments, the bottomhole temperature has a range of 70 to 300° F. Some embodiments may be applied to cased holes and/or open holes with or without gravel pack. The method is applicable for treating of oil and gas producing wells, water injection wells, geothermal wells, or wells in transition between one of these uses.

After the end of treatment, particulates degrade or dissolve and can be easily cleaned up without causing any significant formation damage thus opening the formation matrix for hydrocarbon or water (in case of injection or geothermal well) flow.

Some embodiments may also relate to the stimulation of geothermal wells. Sandstone acidizing is a good way to stimulate geothermal wells to bypass near-wellbore skin and/or to improve reservoir contact. In case the water-bearing interval is heterogeneous, the treatment will benefit from having a diverter such as VES.

The first part of our discussion summarizes results for acid mixed with VES fluid. At a wellsite, the material is pumped at a pressure below fracturing pressure. In some embodiments, the VES fluid causes diversion of treatment fluid from higher-permeability to lower-permeability sections of the interval. In some embodiments, the acidizing fluid mixed with VES can be pumped during the entire acid treatment or during a portion of an acid treatment in single or multiple steps. In some embodiments, the VES fluid is chosen out of the chemical composition discussion presented above. In some embodiments, upon completion of the treatment, the interpore space is cleaned up easily and does not cause any secondary damage to the formation.

When pumped into the formation, such mixture would penetrate the formation and develop resistance due to viscous and elastic properties of the components. That resistance is relatively stronger in higher permeability formations, likely due to strong shear-thinning properties of VES component. At some point, the resistance would divert treatment fluid from higher permeability sections to lower permeability sections, thus causing self-diverting. Eventually, good coverage of heterogeneous interval can be achieved in a single run. The residues of VES fluid later can be washed out of the interpore space by post-flush of mutual solvent and/or by oil produced from the formation.

Specific non-limiting examples of VES additives follow. Not to be limited by theory, when discussing VES here, when we refer to "viscous", or "viscoelastic", or "gelled" fluids, we mean fluids in which viscoelastic surfactant molecules have aggregated to increase the viscosity. Initial fluids (i.e. before any acid is spent) generally have viscosities below about 50 cP (depending upon the acid content, temperature, shear rate, etc.); gelled fluids generally have viscosities above about 50 cP, for example above 100 cP. Thus, injection of an initial fluid that is not viscous because it contains a viscoelastic surfactant concentration too low to contribute to the initial viscosity of the fluid may nonetheless be used to treat a formation with a "viscous" fluid; in other words, the formation (at least at a distance from the wellbore) is being treated with a fluid more viscous than what is injected. Even if the surfactant is not a viscoelastic surfactant, i.e. not one that is known to form aggregates under certain conditions that increase the viscosity and produce viscoelasticity, certain surfactants have none-theless been found that behave in the same way, i.e. they may be injected into a formation under conditions at which they do not provide diversion (for example at a concentration at which they do not provide diversion), but they develop the ability to inhibit fluid flow through porous media as they are flowing through the porous media. That is, they provide diversion after they have been flowing through a formation. In matrix treatments, for example, this initial fluid system forms wormholes and then creates resistance to flow at or near the tip of the wormhole, causing diversion. In acid fracturing, for example, this initial fluid creates resistance to flow where leakoff is high, and so this fluid system controls leakoff. In the term "surfactant", here, we include certain commercially available surfactants that are obtained as concentrates in mixtures that may contain various other components that may be by-products of manufacture or may function as solvents, stabilizers, diluents, etc.

U.S. patent application Ser. No. 10/969,110 discusses how many viscoelastic surfactants may be used this way, but certain cationic surfactants were preferred. Exemplary cationic viscoelastic surfactants include the amine salts and quaternary amine salts disclosed in U.S. Pat. Nos. 5,979,557 and 6,435,277 which have a common Assignee as the present application and which are hereby incorporated by reference.

Examples of suitable cationic viscoelastic surfactants include cationic surfactants having the structure:

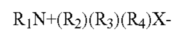

in which R1 has from about 14 carbon atoms to about 26 carbon atoms and may be branched or straight chained, aromatic, saturated or unsaturated, and may contain a carbonyl, an amide, a retroamide, an imide, a urea, or an amine; R2, R3, and R4 are each independently hydrogen or a C1 to about C6 aliphatic group which may be the same or different, branched or straight chained, saturated or unsaturated and one or more than one of which may be substituted with a group that renders the R2, R3, and R4 group more hydrophilic; the R2, R3 and R4 groups may be incorporated into a heterocyclic 5- or 6-member ring structure which includes the nitrogen atom; the R2, R3 and R4 groups may be the same or different; and X—is an anion. Mixtures of such compounds are also suitable. As a further example, R1 is from about 18 carbon atoms to about 22 carbon atoms and may contain a carbonyl, an amide, or an amine, and R2, R3, and R4 are the same as one another and contain from 1 carbon atom to about 3 carbon atoms.

Cationic surfactants having the structure $R_1N+(R_2)(R_3)(R_4)$ X− may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As-received commercially available VES surfactant concentrate formulations, for example cationic VES surfactant formulations, may also optionally contain one or more members of the group consisting of solvents, mutual solvents, organic acids, organic acid salts, inorganic salts, and oligomers, polymers, co-polymers, and mixtures of these members. They may also contain performance enhancers, such as viscosity enhancers, for example polysulfonates, for example polysulfonic acids, as described in United States Patent Application Publication No. 2003-0134751, which has a common Assignee as the present application and which is hereby incorporated by reference.

Another suitable cationic VES is erucyl bis(2-hydroxyethyl) methyl ammonium chloride, ("EMHAC"), also known as (Z)-13 docosenyl-N—N-bis(2-hydroxyethyl) methyl ammonium chloride. It is commonly obtained from manufacturers as a mixture containing about 60 weight percent surfactant in a mixture of isopropanol, ethylene glycol and water. In this patent, when we refer to "EMHAC", we mean such a solution. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis (hydroxyethyl) ammonium iodide; and cetylamino, N-octadecyl pyridinium chloride.

Zwitterionic viscoelastic surfactants are also suitable. Exemplary zwitterionic viscoelastic surfactants include those described in U.S. Pat. No. 6,703,352 which has a common Assignee as the present application and which is hereby incorporated by reference. Exemplary zwitterionic surfactants have the structure:

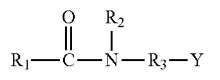

in which R1 is a hydrocarbyl group that may be branched or straight chained, aromatic, aliphatic or olefinic and contains from about 14 carbon atoms to about 26 carbon atoms and may include an amine; R2 is hydrogen or an alkyl group having from 1 carbon atom to about 4 carbon atoms; R3 is a hydrocarbyl group having from 1 to about 5 carbon atoms; and Y is an electron withdrawing group. More particularly, the zwitterionic surfactant may have the betaine structure:

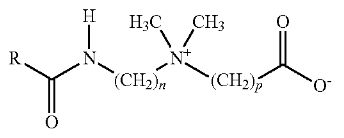

in which R is a hydrocarbyl group that may be branched or straight chained, aromatic, aliphatic or olefinic and has from about 14 carbon atoms to about 26 carbon atoms and may contain an amine; n=about 2 to about 4; and p=1 to about 5. Mixtures of these compounds may also be used.

Two examples of suitable betaines are, respectively, BET-O-30 and BET-E-40. The VES surfactant in BET-O-30 is oleylamidopropyl betaine. It is designated BET-O-30 here, because as obtained from the supplier (Rhodia, Inc. Cranbury, N.J., U.S.A.), it is called Mirataine BET-O-30; it contains an oleyl acid amide group (including a $C_{17}H_{33}$ alkene tail group) and is supplied as about 30% active surfactant; the remainder is substantially water, sodium chloride, glycerol and propane-1,2-diol. An analogous suitable material, BET-E-40, was used in the experiments described below; one chemical name is erucylamidopropyl betaine. BET-E-40 is also available from Rhodia; it contains an erucic acid amide group (including a C21H41, alkene tail group) and is supplied as about 40% active ingredient, with the remainder substantially water, sodium chloride, and isopropanol. BET surfactants, and others that are suitable, are described in U.S. Pat. No. 6,703,352.

Certain co-surfactants may be useful in extending the brine tolerance, to increase the gel strength, to reduce the shear rehealing time, and/or to reduce the shear sensitivity of zwitterionic VES fluid systems, such as betaine VES fluids. An example given in U.S. Pat. No. 6,703,352 is sodium dodecylbenzene sulfonate (SDBS). Another example is polynaphthalene sulfonate. Zwitterionic VES's may be used with or without this type of co-surfactant, for example those having a SDBS-like structure having a saturated or unsaturated, branched or straight-chained C6 to C16 chain; further examples of this type of co-surfactant are those having a saturated or unsaturated, branched or straight-chained C8 to C16 chain. Other suitable examples of this type of co-surfactant, especially for BET-O-30, are certain chelating agents such as trisodium hydroxyethylethylenediamine triacetate. Many suitable additives are known for improving the performance of gelled VES surfactant systems; any may be used in the current invention; they should be tested for compatibility with the compositions and methods of the invention before use; simple laboratory experiments for such testing are well known.

Zwitterionic surfactant viscoelastic systems typically contain one or more members of the group consisting of organic acids, organic acid salts, inorganic salts, and oligomers, polymers, co-polymers, and mixtures of these members. This member is typically present in only a minor amount and need not be present at all. The organic acid is typically a sulfonic acid or a carboxylic acid and the anionic counterion of the organic acid salts are typically sulfonates or carboxylates. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred are salicylate, phthalate, p-toluene sulfonate, hydroxynaphthalene carboxylates, e.g. 5-hydroxy-1-naphthoic acid, 6-hydroxy-1-naphthoic acid, 7-hydroxy-1-naphthoic acid, 1-hydroxy-2-naphthoic acid, preferably 3-hydroxy-2-naphthoic acid, 5-hydroxy-2-naphthoic acid, 7-hydroxy-2-naphthoic acid, and 1,3-dihydroxy-2-naphthoic acid and 3,4-dichlorobenzoate. The organic acid or salt thereof typically aids the development of increased viscosity that is characteristic of preferred fluids. The organic acid or salt thereof is typically present in the zwitterionic viscoelastic fluid (after the viscoelastic surfactant has concentrated sufficiently to viscosify the fluid) at a weight concentration of from about 0.1% to about 10%, more typically from about 0.1% to about 7%, and even more typically from about 0.1% to about 6%.

Inorganic salts that are particularly suitable for use in the zwitterionic viscoelastic fluid include water-soluble potassium, sodium, and ammonium salts, such as potassium chloride and ammonium chloride. In some embodiments, the use of potassium, sodium or calcium salts may require addition of inhibitors to prevent primary, secondary, and tertiary precipitation reactions in sandstone acidizing. Additionally, calcium chloride, calcium bromide and zinc halide salts may also be used. The inorganic salts may aid in the development of increased viscosity which is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight.

The inorganic salt is typically present in the zwitterionic viscoelastic fluid (after the viscoelastic surfactant has concentrated sufficiently to viscosify the fluid) at a weight concentration of from about 0.1% to about 30%, more typically from about 0.1% to about 10%, and even more typically from about 0.1% to about 8%. Organic salts, e.g. trimethylammonium hydrochloride and tetramethylammonium chloride, may also be used in addition to, or as a replacement for, the inorganic salts. Optionally, these systems may be formed in dense brines, including brines containing polyvalent cations.

As an alternative to the organic salts and inorganic salts, or as a partial substitute therefore, one can use a medium to long chain alcohol (preferably an alkanol), preferably having five to ten carbon atoms, or an alcohol ethoxylate (preferably an alkanol ethoxylate) preferably of a 12 to 16 carbon alcohol and having 1 to 6, preferably 1-4, oxyethylene units.

Amphoteric viscoelastic surfactants are also suitable. Exemplary amphoteric viscoelastic surfactants include those described in U.S. Pat. No. 6,703,352, for example amine oxides. Mixtures of zwitterionic surfactants and amphoteric surfactants are suitable. An example, called BET-E-40/AO here, is a mixture of about 13% isopropanol, about 5% 1-butanol, about 15% ethylene glycol monobutyl ether, about 4% sodium chloride, about 30% water, about 30% cocamidopropyl betaine, and about 2% cocamidopropylamine oxide.

The formation treatment fluid containing a low-concentration of a surfactant (or surfactant concentrate containing other components) that can develop the ability to divert as it flows through a porous medium typically contains a formation-dissolving agent, for example hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, for example trisodium hydroxyethylethylenediamine triacetate, and salts of these acids and mixtures of these acids and/or salts. For sandstone treatment, the fluid also typically contains a hydrogen fluoride source. The hydrogen fluoride source may be HF itself or may be selected from ammonium fluoride and/or ammonium bifluoride or mixtures of the two; when strong acid is present the HF source may also be one or more of polyvinylammonium fluoride, polyvinylpyridinium fluoride, pyridinium fluoride, imidazolium fluoride, sodium tetrafluoroborate, ammonium tetrafluoroborate, salts of hexafluoroantimony, and mixtures. When the formation-dissolving agent is a strong acid, the fluid preferably contains a corrosion inhibitor. The fluid optionally contains chelating agents for polyvalent cations, for example especially aluminum, calcium and iron (in which case the agents are often called iron sequestering agents) to prevent their precipitation. Some of the formation-dissolving agents just described are such chelating agents as well. Chelating agents are added at a concentration, for example, of about 0.5% (of active ingredient).

Anionic viscoelastic surfactants may also be used at initial concentrations below the concentrations at which they form viscoelastic fluids. The anionic surfactant may be employed as the free acid or, for example, as the sodium, potassium, or ammonium salt. Examples of suitable anionic surfactants include polyalkoxy carboxylic acids, acylated protein hydrolysates, N-acylsarcosinates, alkyl carboxylic acids, cycloalkyl carboxylic acids, aryl carboxylic acids, alkyl phosphates, alkyl thiophosphates, alkyl polyphosphates, and ethoxylated phosphate esters.

Further examples of suitable anionic surfactants are carboxylic acids having the generic structure:

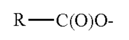

wherein R represents alkyl, alkenyl, arylalkyl, and hydroxyalkyl wherein each of said alkyl groups contains from about 8 carbon atoms to about 24 carbon atoms, more preferably at least 16 carbon atoms, and may be branched or straight chained and saturated or unsaturated, and wherein when branched the branch alkyl groups have from about 1 carbon atom to about 6 carbon atoms. Representative of alkyl groups for R include decyl, dodecyl, tetradecyl (myristyl), hexadecyl (cetyl), octadecyl (oleyl), lauryl, palmityl, stearyl, erucyl, and the derivatives of coco, tallow, soya, and rapeseed oils. Oleyl is particularly preferred. Dimers of unsaturated acids may also be used, such as oleic acid dimer. The R groups may be substituted with other groups provided that these surfactants remain viscoelastic surfactants.

Another suitable class of anionic surfactants is ethoxylated anionic surfactants of the general formula:

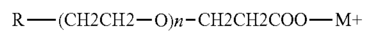

having an alkyl chain R of from about 6 carbon atoms to about 30 carbon atoms, that can be straight chained or branched, and saturated or unsaturated, and a value of n from 0 to about 20, preferably less than about 10. The cation is inorganic (for example K+, Na+, and Cs+) or organic (for example quaternary amine). An example is sodium laureth-13 carboxylate, sold by Rhodia, Inc. Cranbury, N.J., U.S.A. under the trade name Miranate LEC-80, and hereinafter referred to as "LEC". LEC has a C12 straight chained alkyl group, 13 ethoxy groups and a sodium cation. As received, Miranate LEC-80 is about 79% active ingredient and also contains mixed alcohol and water.

The diverting effect developed by viscoelastic surfactant fluid systems initially injected below their viscosifying concentrations may be enhanced by the inclusion of small amounts of low molecular weight alcohols. Examples are methanol, ethanol, and propanol, at weight concentrations of from about 0.5% to about 5%, preferably at concentrations of about 1%.

In some cases, mixtures of viscoelastic surfactants that individually would gel, as the acid is depleted, but as a mixture do not (for example because the different surfactants interfere with one another's ability to form viscosity-enhancing structures), may still be useful. An example is a mixture of one or more zwitterionic VES surfactants and one or more quaternary VES surfactants. When mixed, this VES surfactant mixture does not aggregate into viscosity-enhancing configurations. However, when such a mixture flows through a porous medium, resistance to fluid flow may develop. Another useful case is a mixture of surfactants (for example more than one viscoelastic surfactant, or one or more viscoelastic surfactants and one or more non-viscoelastic surfactants) that cannot generate resistance to flow in the concentration ratio in which they are provided but will do so at another ratio or when one or more of the surfactants is removed (which changes result from the mixture interacting with a formation through which it is flowing). Another example is a surfactant or mixture of surfactants, containing an additive (for example polynaphthalene sulfonate), which will generate adequate viscosity if some or all of the additive is removed, allowing generation of resistance to flow.

Certain surfactant mixtures (including the solvents and other components in the concentrates) that are not normally considered to be viscoelastic surfactants may be used. The following have been used successfully (see the examples below):

Surfactant Mixture A (SMA) (Concentrations Approximate):
- 10-30% acetic acid
- 1-5% naphthalene
- 10-30% ethylene glycol
- 10-30% heavy aromatic petroleum naphtha
- 40-60% proprietary emulsifying agent surfactant Surfactant Mixture B (SMB) (Concentrations Approximate):
- 5% methanol
- 35% isopropanol
- 39% water
- 20% poly(oxy-1,2-ethanediyl) nonyl phenol
- 0-1% perfluorinated quaternary amine iodide or chloride solution Surfactant Mixture C (SMC) (Concentrations Approximate):
- 20% isopropanol
- 20% ethylene glycol monobutyl ether
- 30% water
- 20% ethoxylated C11 linear/branched alcohols
- 10% ethoxylated C12-C15 linear alcohols Surfactant Mixture D (SMD) (Concentrations Approximate):
- 13% ethanol
- 15% ethylene glycol monobutyl ether
- 17-25% water
- 26-51% ammonium C6-C10 alcohol ethoxysulfate
- 1% C6-C10 ethoxylated alcohols Mixtures such as those listed directly above are commonly commercially available for various purposes such as dispersants, foaming or non-foaming agents, wetting or non-wetting agents, and the like. It can readily be determined whether such surfactant mixtures will be suitable for the present invention by experiments such as those detailed below. Non-limiting examples of suitable classes of compounds that are the surfactant ingredients of the mixtures include alkyl phenols, alkoxy phenols, alkoxy alcohols, and alkoxy sulfates. Although testing has not been done, it is believed that suitable carbon chain lengths in the alkyl groups range from about C10 to C22; that chains may be linear or branched; may be saturated or unsaturated; and may be substituted. Alkoxy groups are usually ethoxy but may be propoxy or mixtures of the two; the number of alkoxy groups preferably ranges from about 1 to about 7.

Additionally, some embodiments may benefit from viscoelastic diverting acid. The mechanism of self-diversion of Viscoelastic Diverting Acid (VDA) in carbonates is described for comparison only. Viscosity of VDA strongly depend on the fluid pH. VDA is added to the fresh acidizing fluid, which typically has very low pH (below 1). While fluid reacts with carbonates two processes occur 1. acid etches the formation and creates wormholes and 2. while fluid interacts with carbonates it spends protons and pH increases.

While pH increases, the VDA viscosity raises dramatically. Increased VDA viscosity causes additional resistance and diverts the following fluid to other sections of the interval. After the treatment viscosified VDA remains in the wormholes. When the well is switched back to the production mode, hydrocarbons flow into wormholes and relatively easily got mixed with the VDA due to high transport properties of the wormholes. Upon mixing with hydrocarbons VDA breaks, loses its viscosity and flows away from the wormholes.

Similar application of VDA cannot be replicated in sandstone acidizing because existing acidizing fluid systems cannot provide controlled reliable changes in pH while treating the sandstone formation (due to more complex chemistry of sandstone acidizing and the necessity to control re-precipitation).

Next, FIGS. 6A-6D provide a series of sectional views of self-diverting acid as illustrated by the examples below.

Figure 6E:
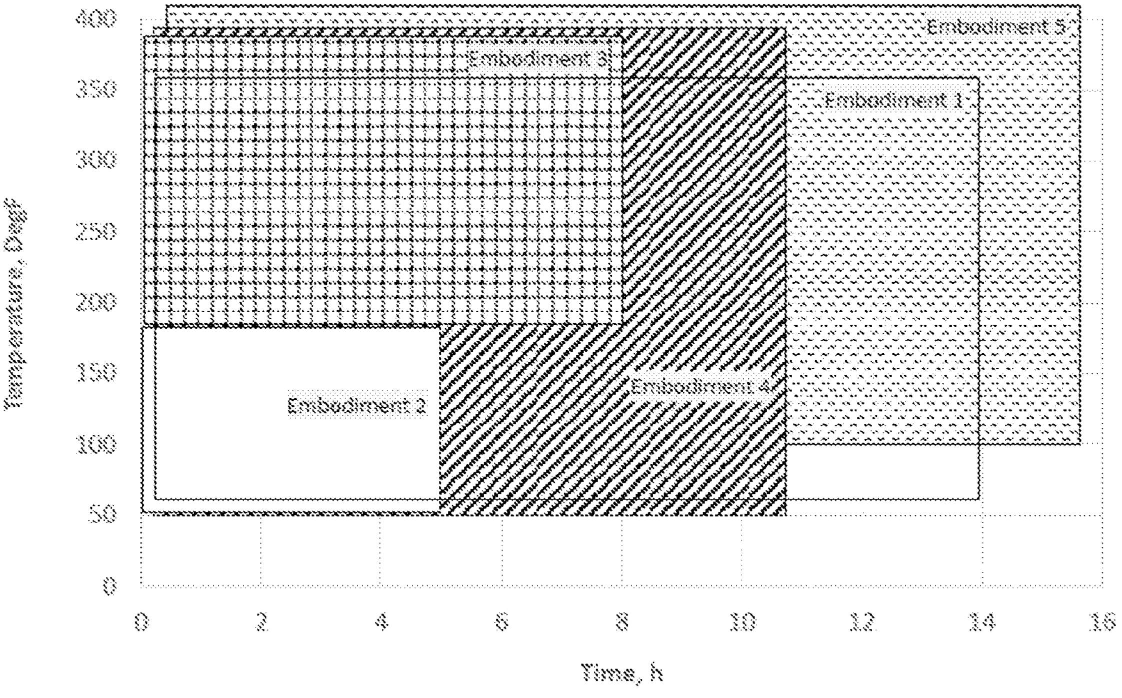
FIG. 6E is a plot of temperature as a function of time for five embodiments.
Figure 7:
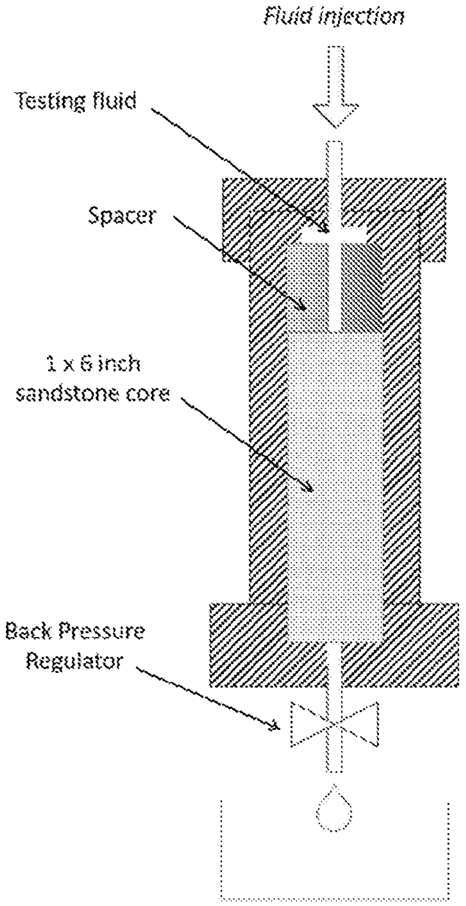
FIG. 7 is a sectional view of an apparatus for conducting core sample permeability tests.

The following examples illustrate sandstone acidizing effectiveness. FIG. 6E summarizes temperature as a function of time for Embodiments 1-5 as summarized in Chart 1 above and discussed in more detail below. Core tests were conducted for many of these lab results below. FIG. 7 is a sectional view that shows a sandstone core was held in an elastomer sleeve by a confining pressure of 1,100 psi. FIG. 7 shows a fluid injection 101, testing fluid 102, spacer 103, sandstone core 104 that may have dimensions of 1 inch by 6 inches, back pressure regulation 105, and fluid exit 106. Unless otherwise indicated, in all tests, core dimensions were: diameter 1 inch, length 6 inches and flowrate was 2 ml/min. Back pressure of 500 psi was applied. Unless otherwise indicated, the core temperature was maintained at 200° F. Prior to injection of single-stage acid with VES fluid the core was pre-flushed with 5% ammonia chloride. After acid injection the core was post-flushed with 5% ammonia chloride as well.

Embodiment 1.1

A mixture of a single-stage sandstone acidizing fluid with VES is pumped into the interval with high permeability contrast. VES additive causes similar pressure response in the sections with various permeability thus providing self-diversion. Embodiment 1 relates to viscoelastic surfactant. In this embodiment, flexible particles have sub-micron size and are formed by self-assembled molecules of viscoelastic surfactant (VES) fluid. In this embodiment, VES fluid is mixed with the treating acid at the surface. In this embodiment, the diversion is achieved due to shear-thinning properties of VES solution as well as (in case of small pore throat) due to a resonance between size of self-assembled VES molecules and between pore throat size. A lab example below demonstrates the feasibility of this approach. Example 1 (relevant to Embodiment 1.1).

This example shows the effect of diversion of VES additive. VES fluid (at concentration of 30 gpt) was mixed with a single stage acid to form a homogeneous mix and was pumped through sandstone core (length 6-inch, diameter 1-inch) in a core-flow test mimicking the actual sandstone acidizing protocol (FIG. 7).

Figure 8:
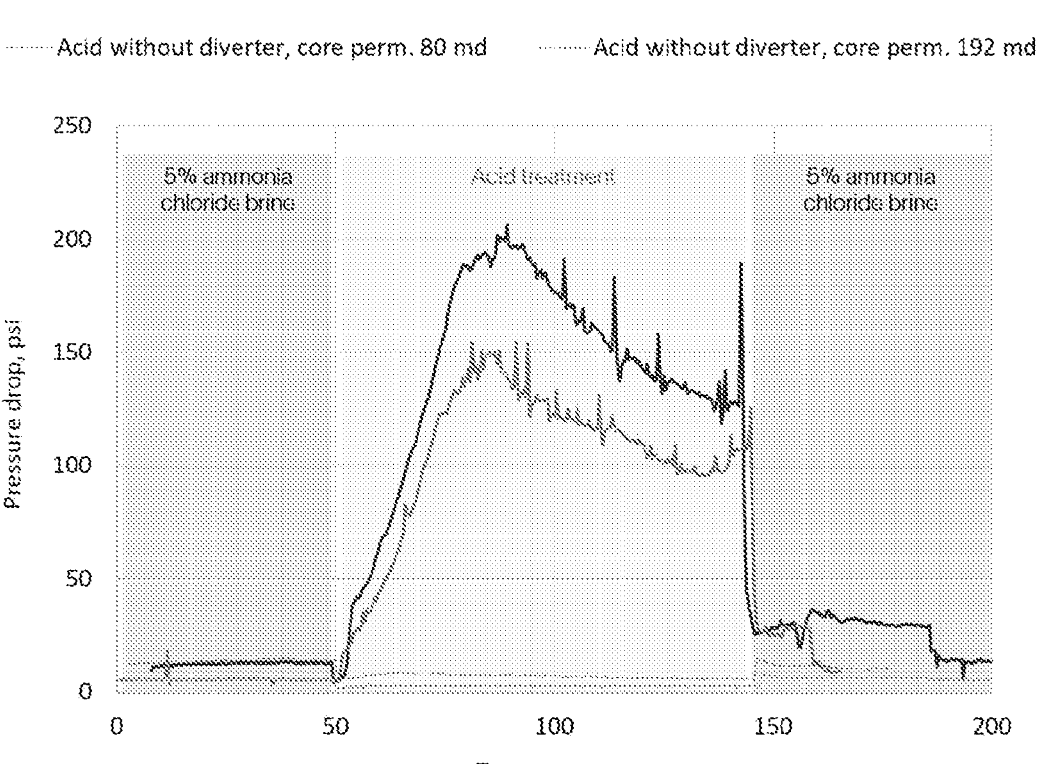
FIG. 8 provides pressure as a function of time for four flow tests with varied permeability cores. Flowrate in all tests was 2 ml/min at all time.
Figure 9A:
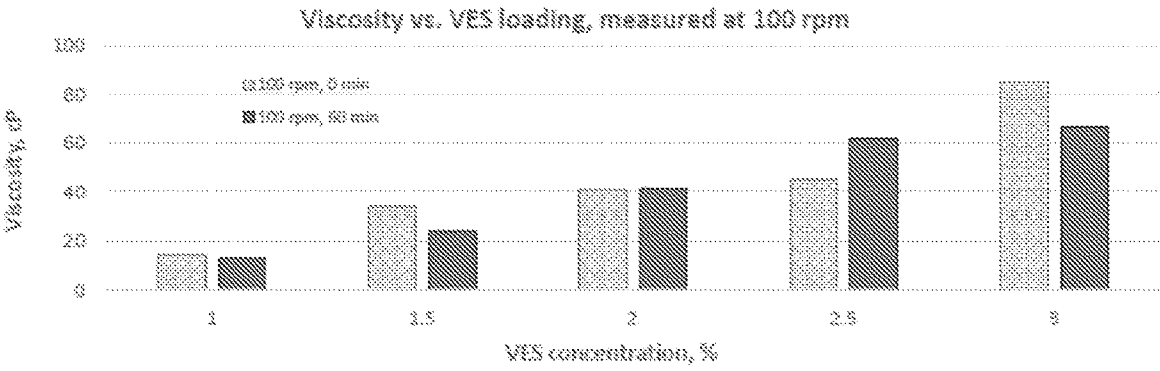
FIGS. 9A and 9B are plots of viscosity as a function of VES concentration at two different agitation rates at room temperature.
Figure 9B:
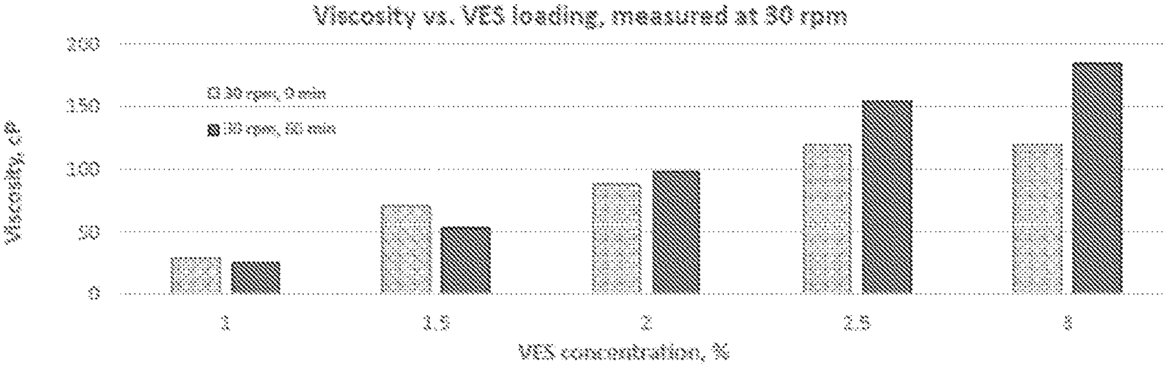

Two tests were run: with cores 85 mD and 192 mD. During acid injection we monitored and tracked the pressure drop on the core (FIG. 8). FIG. 8 shows the pressure response in coreflow tests where acid with and without VES was pumped through the cores of different permeability. As one can see despite almost 2.5 times difference in core initial permeability, pressure drop in the test was within a factor of 0.75 similar to each other. It means that in the actual treatment fluid would be almost uniformly distributed among the sections with permeability at least within 85-192 mD, which is an indication of self-diversion properties of the fluid.

In some embodiments, it may be desirable to divert from a water zone to an oil bearing zone (i.e. to inject the treatments preferentially in the oil zones to stimulate them more than the water zones). This is mainly for VES fluids but emulsified fluids can also be used for this. Both VES fluids and emulsified fluids have a higher resistance to flow in the water zone. This is because VES fluids break in the oil zones and oil external emulsions have a lower relative permeability in the oil zones.

Embodiment 1.2

A mixture of a single-stage sandstone acidizing fluid with VES is pumped into the interval sections having various water cut. VES laden fluid develops resistance to its propagation faster when propagating into the water-wet formation rather than to oil-wet formation. As a result acid would stimulate predominantly oil-bearing section of the interval rather than the water-bearing sections, thus improving oil production and reducing well water-cut.

Figure 10:
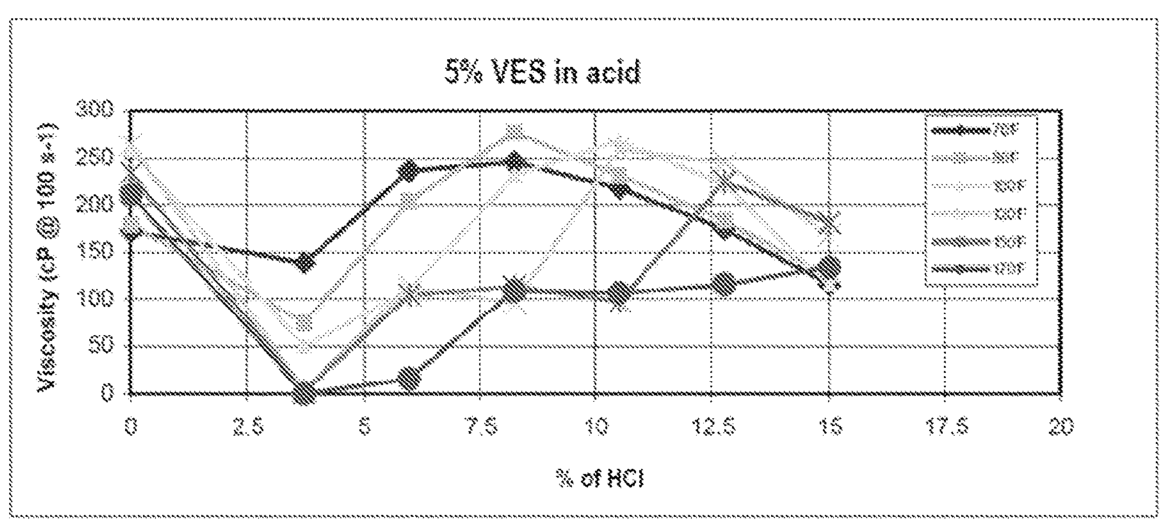
FIG. 10 is a comparison of viscosity as a function of hydrochloric acid at varied temperature for a fluid comprising 5 weight percent VES.
Figure 11:
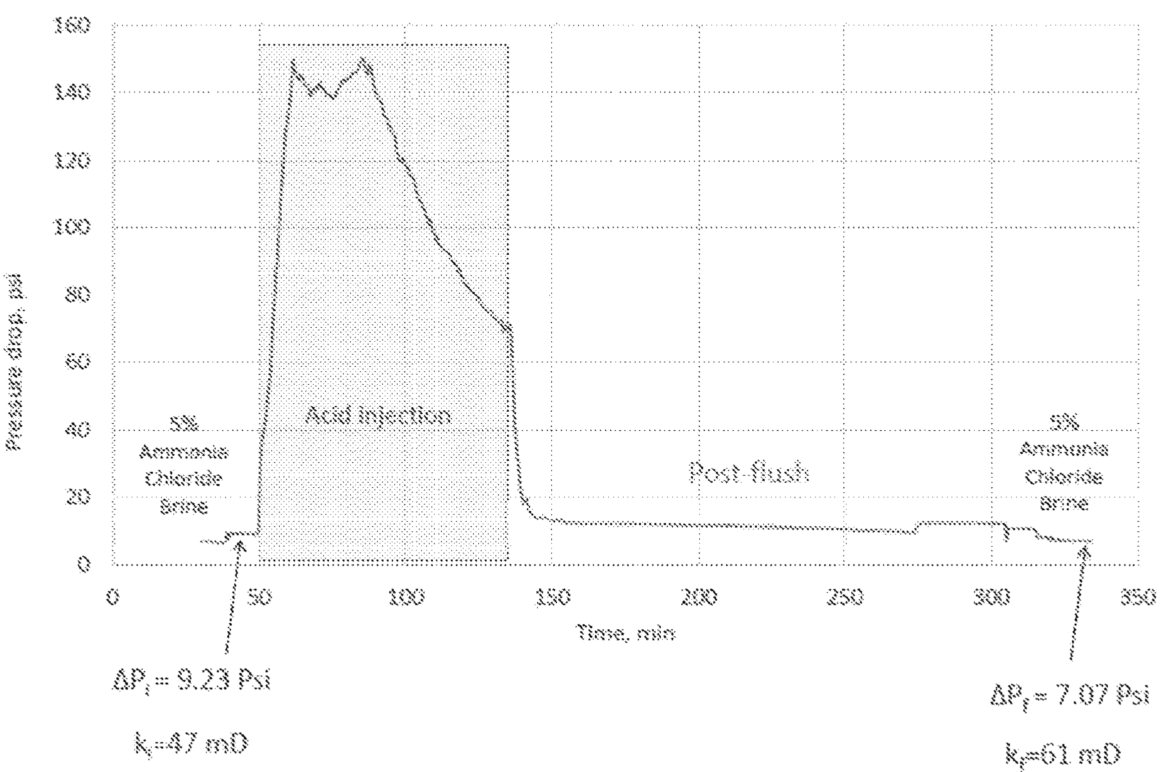
FIG. 11 is a plot of pressure drop as a function of time for a composition with 2 percent VES at 200° F. Flowrate was 2 ml/min at all time.

Applicability Range:

Formation type: Sandstone
Pore throat size range: 0.001 μm-30 μm
Permeability contrast: 1.1-30
BHT range: 70-300° F.
Completion type: cased, open hole wells, compatible with gravel pack
Well type: producer or injector
VES concentration range: 1-30 gpt
VES chemical identity examples: See above
Droplet hydrophobic chemistry: Xylene, D-lemonene
Applicable to geothermal wells: yes
Mixed: at surface Additional comparison data is shown in FIGS. 9A, 9B, 10, and 11. FIG. 10 is a comparison of viscosity as a function of hydrochloric acid at varied temperature for a fluid comprising 5 weight percent VES. FIG. 11 is a plot of pressure drop as a function of time for a composition with 2 percent VES at 200° F. The pressure response in the coreflow test where acid with VES was pumped through a sandstone core at a temperature of 200° F. with dimensions of diameter 1 inch, length 6 inch. The flowrate was 2 ml/min throughout the entire treatment.

Embodiment 2

In another embodiment, flexible particles are formed by droplets of hydrophobic liquid that are dispersed in a single-stage acid and are pumped along with it to the formation. Droplets of hydrophobic material are stabilized by surfactant and suspended in the acid to form an emulsion. Droplet size and concentration can be varied by selection of surfactant and shear rate. Droplet size can be measured.

Such particles would cause extra resistance in pores with comparable size, thus diverting fluid to the sections with lower permeability.

Later, such droplets can be washed away either by a flow of hydrocarbons or by a post-flush containing mutual solvent.

Non-limiting examples of such hydrophobic fluid are Xylene and D-limonene.

Figure 13:
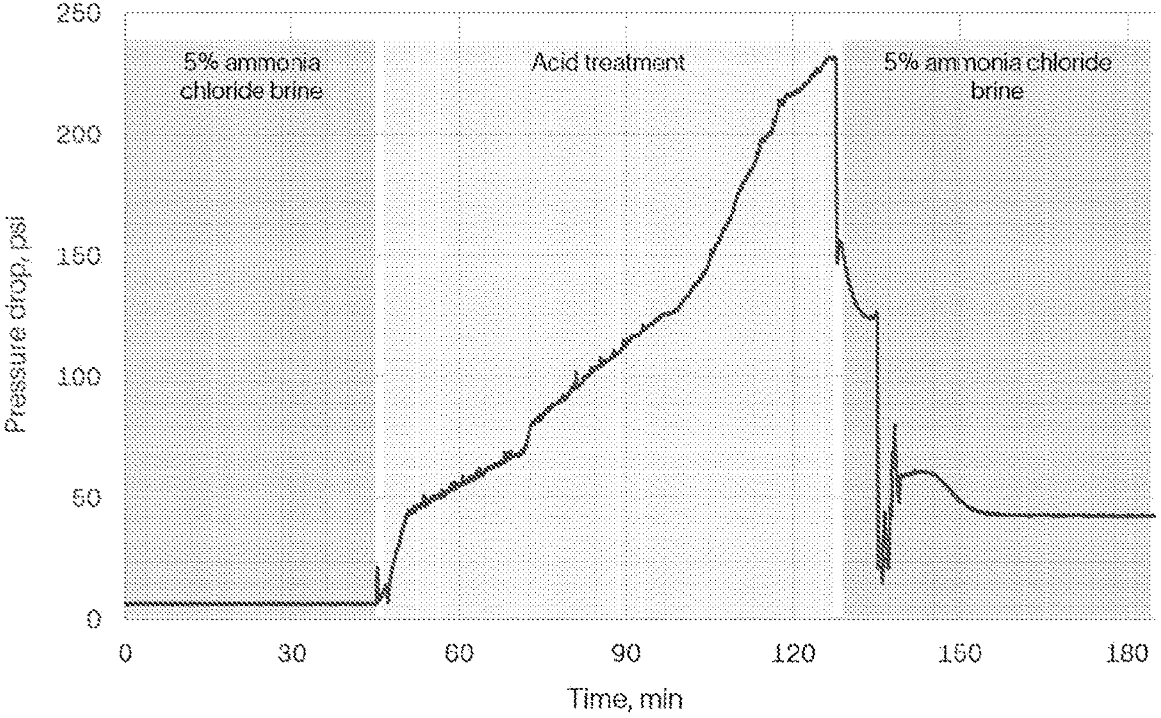
FIG. 13 plots pressure drop as a function of time across a workflow for one embodiment. Flowrate was 2 ml/min at all time.

FIG. 12 provides a chart to compare dispersion stability over time. It shows the effect of temperature on dispersion stability prepared with 15 weight percent HCl and an organic solvent. FIG. 13 provides pressure drop as a function of time at 160° F. It shows the pressure response in coreflow test where dispersion oil in acid was pumped through a sandstone core at T=160° F. with dimensions: diameter 1 inch, length 6 inch. Flowrate was 2 ml/min throughout the entire treatment.

Embodiment 2 Application Range

Formation type: Sandstone
Pore throat size range: 0.1 μm-300 μm
Permeability contrast: 1.1-30
BHT range: 70-300° F.
Completion type: cased, open hole wells, compatible with gravel pack
Well type: producer or injector
Hydrophobic fluid chemical identity examples: Xylene, D-limonene
Applicable to geothermal wells: yes
Mixed: at surface Embodiment 3

Figures 14A, 14B:
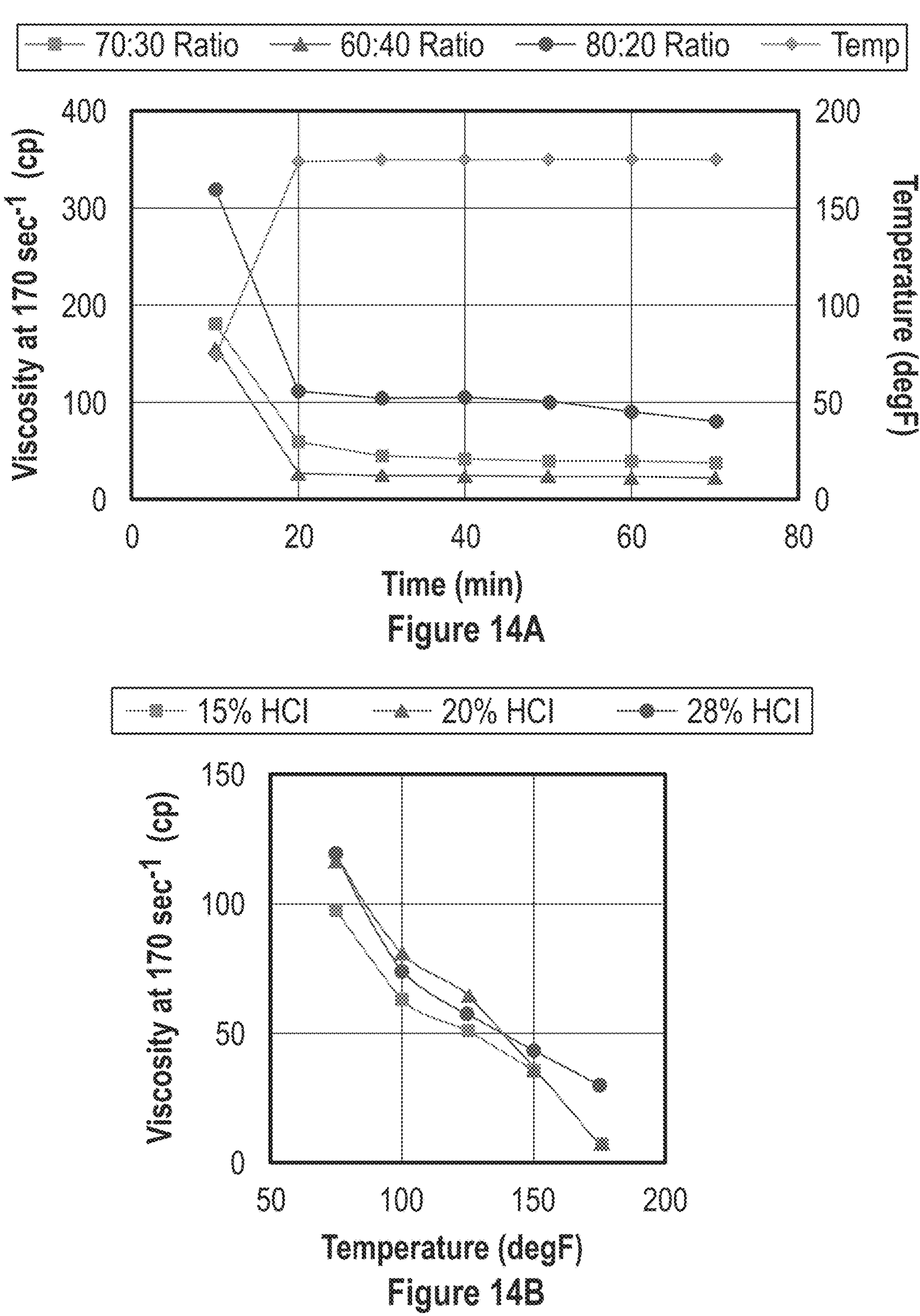
FIGS. 14A and 14B are plots of viscosity as a function of time for varied compositions.
Figure 15:
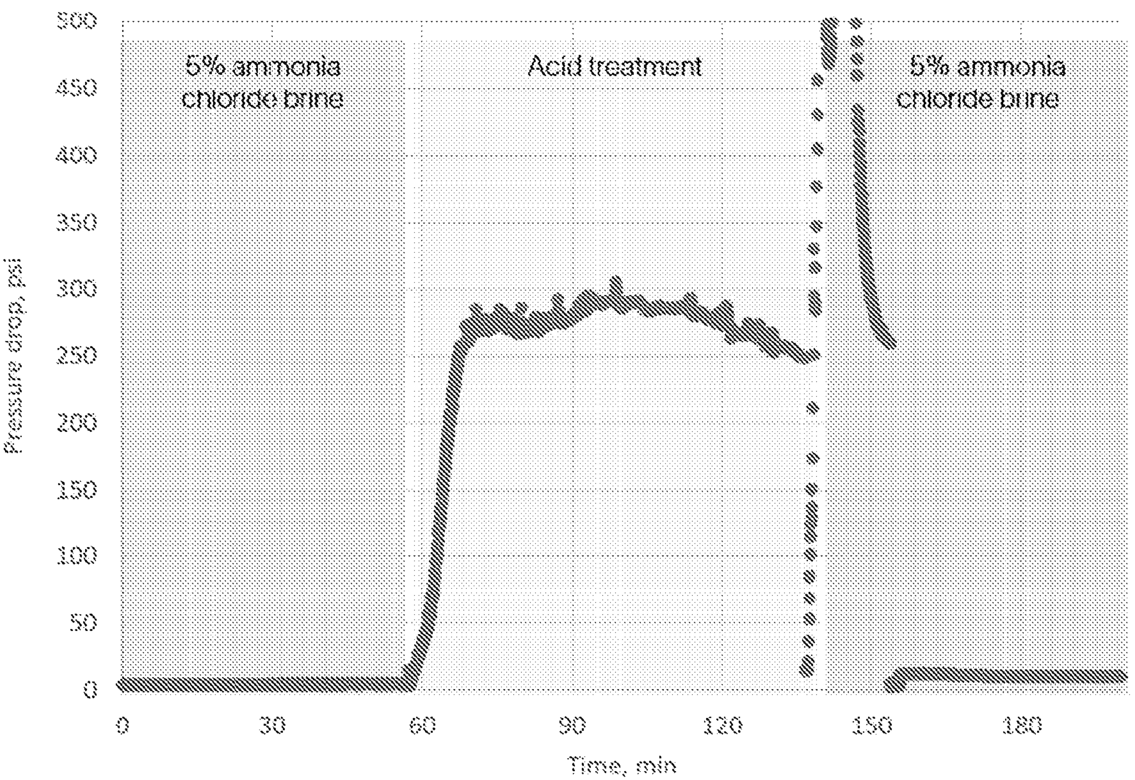
FIG. 15 is a plot of pressure drop as a function of time for a coreflow test. Flowrate was 2 ml/min at all time.

In another embodiment, flexible particles are formed by droplets of a single-stage sandstone acid stabilized and suspended in a hydrophobic fluid. Examples of such hydrophobic fluids are d-Limonene and Xylene. Droplet size can be varied by selection of surfactant and shear rate. Such particles would cause extra resistance in pores with comparable size, thus diverting fluid to the sections with lower permeability. FIGS. 14A and 14B plot viscosity as a function of time for varied emulsion ratios and acid concentrations. FIG. 15 provides pressure drop as a function of time. It shows pressure response in a coreflow test where emulsion acid in oil was pumped through a sandstone core at 200° F. with dimensions of diameter 1 inch and length 6 inch. The flowrate was 2 ml/min throughout the entire treatment.

Embodiment 3 Application Range

Formation type: Sandstone
Pore throat size range: 0.1 μm-300 μm
Permeability contrast: 1.1-30
BHT range: 70-350° F.
Completion type: cased, open hole wells, compatible with gravel pack
Well type: producer or injector
Hydrophobic fluid chemical identity examples: Xylene, D-lemonene
Applicable to geothermal wells: yes
Mixed: at surface Embodiment 4

In yet another embodiment, flexible particles are formed by droplets of gas (in the form of energized fluid or in the form of foam) suspended in a single-stage sandstone acid. Droplets or foam is stabilized and suspended by a surfactant. Non-limiting examples of gas may include air, nitrogen, $CO_2$, and argon.

Air droplet size and/or foam quality can be varied by selection of surfactant and by a mixing shear rate. Air bubbles or foam structure would cause extra resistance in pores with comparable size, thus diverting fluid to the sections with lower permeability.

FIG. 16 is a chart comparing concentration to foam agent and foam height, half-life, and performance index. It includes half-life observations as a function of surfactant concentration of fluids with a listed composition at room temperature.

Embodiment 4 Application Range

Formation type: Sandstone
Pore throat size range: 0.01 μm-100 μm
Permeability contrast: 1.1-30
BHT range: 70-350° F.

Completion type: cased, open hole wells, compatible with gravel pack
Well type: producer or injector
Gas examples: air, nitrogen, $CO_2$, argon
Applicable to geothermal wells: yes
Mixed: at surface Embodiment 5

Figure 17:
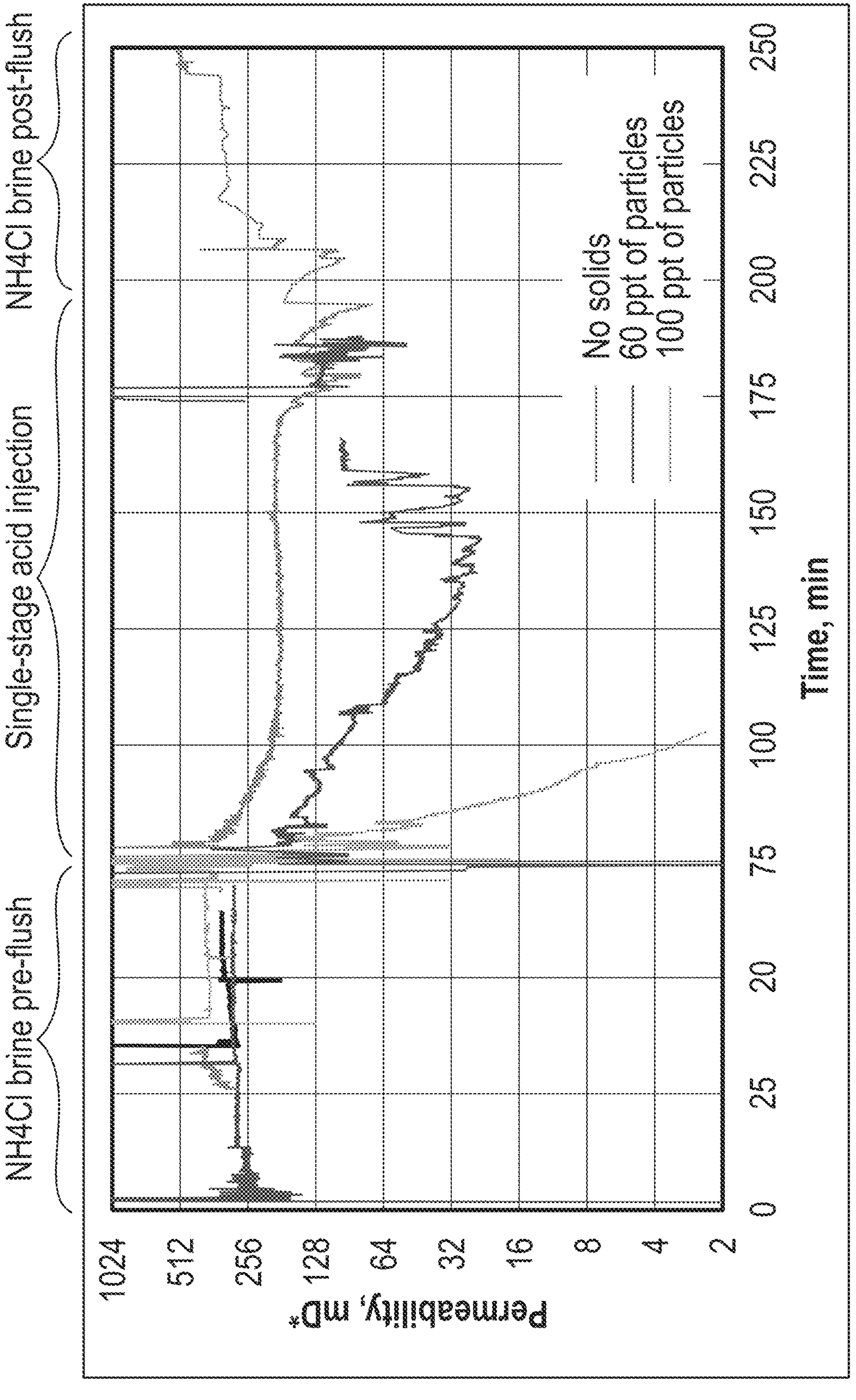
FIG. 17 is a plot of permeability as a function of time for three compositions of no, 60 ppt, and 100 ppt particulates.
Figure 18:
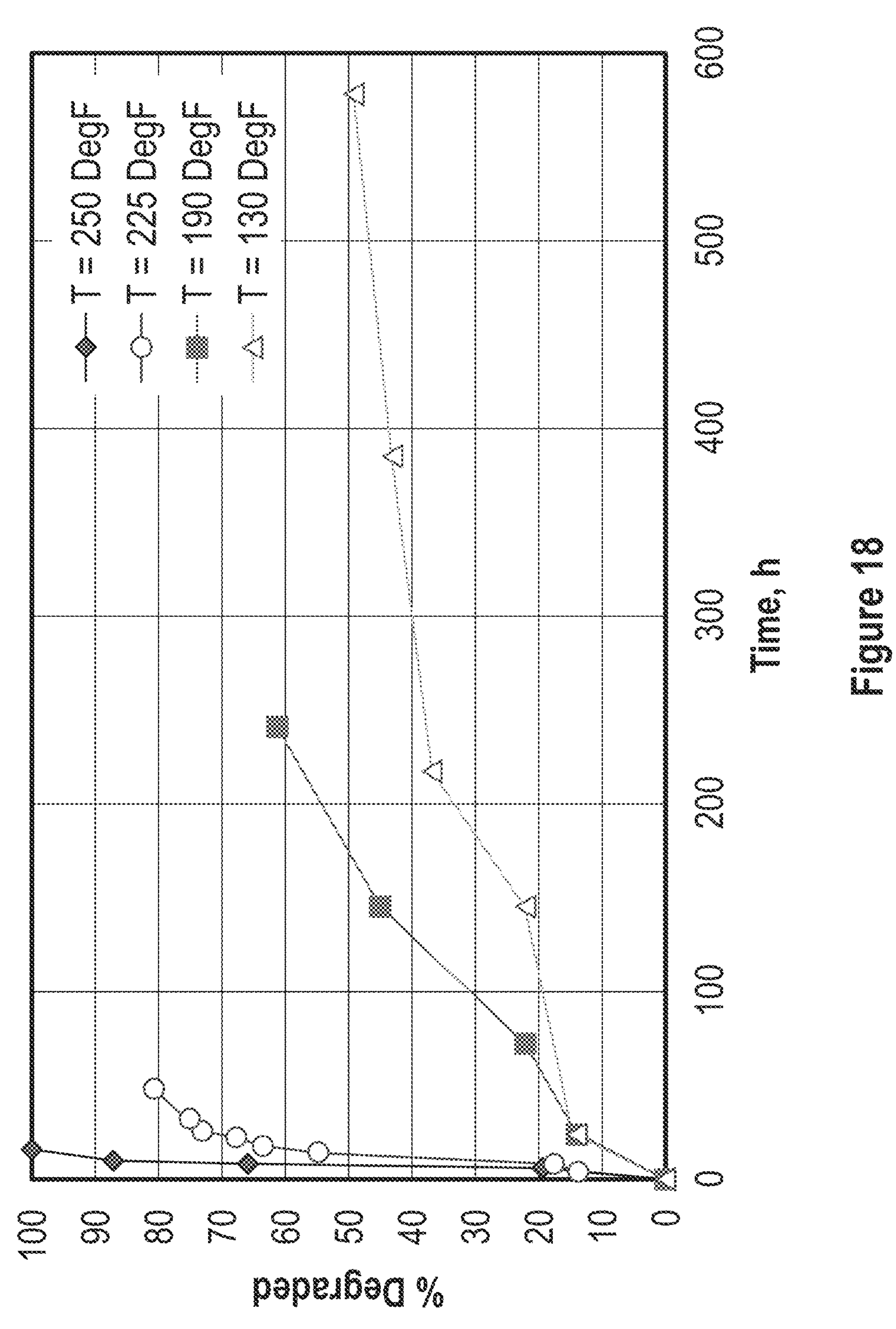
FIG. 18 is a plot of percentage of particulate degradation as a function of time for four temperature profiles including 250, 225, 190, and 130° F.

Embodiment 5 tests a solid suspension. FIG. 17 provides the results of coreflow tests over time including preflush, single stage acid injection, and ammonium chloride brine postflush with no, 60 ppt particulates, and 100 ppt particulates. FIG. 18 summarizes a comparison of percentage of degradation over time for four temperature profiles including 250, 225, 190, and 130° F.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

We claim:

1. A method of treating a siliceous geologic formation, the method comprising:
- flowing a treatment composition into the siliceous geologic formation, wherein the treatment composition has a pH of about −1.0 to about 6.0 and comprises:
  - an acid having molecular weight less than about 200 or an ammonium or sodium salt thereof;
  - an HF source;
  - a precipitation prevention agent; and
  - a transient modifier comprising a degradable material suspended in the treatment composition, wherein the degradable material comprises at least one of droplets of a hydrophobic liquid, droplets of the acid, droplets of a gas, or solid particles;
- allowing the transient modifier to modify a permeability of the siliceous geologic formation via accumulation of the degradable material in interpore space or on a face of the siliceous geologic formation; and
- removing the transient modifier from the interpore space or the face of the siliceous geologic formation to limit residue in the siliceous geologic formation.

2. The method of claim 1, wherein the precipitation prevention agent comprises a chelant.

3. The method of claim 2, wherein the chelant is present in the treatment composition in an amount of about 40.0 weight percent or less, by weight of the treatment composition.

4. The method of claim 1, wherein the precipitation prevention agent comprises a scale inhibitor.

5. The method of claim 4, wherein the scale inhibitor is present in the treatment composition in an amount from about 0.1 weight percent to about 5.0 weight percent, by weight of the treatment composition.

6. The method of claim 4, wherein the scale inhibitor is a phosphonic acid, a phosphoric acid, a phosphonate, a phosphate, a polyacrylamide, a phosphonated polyetheramine, a salt of an acrylamido-methyl propane sulfonate/acrylic acid copolymer, phosphinated maleic copolymer, a salt of a polymaleic acid/acrylic acid/acrylamido-methyl propane sulfonate terpolymer, or a mixture thereof.

7. The method of claim 1, wherein the transient modifier further comprises surfactant.

8. The method of claim 7, wherein the transient modifier further comprises a viscoelastic surfactant.

9. The method of claim 1, wherein the degradable material of the transient modifier comprises the solid particles.

10. The method of claim 9, wherein the degradable material of the transient modifier comprises particles of polylactic acid.

11. The method of claim 1, wherein the degradable material of the transient modifier comprises the droplets of the hydrophobic liquid, wherein the hydrophobic liquid comprises D-limonene or xylene.

12. The method of claim 11, wherein the transient modifier comprises an emulsion of the droplets of the hydrophobic liquid and a surfactant.

13. The method of claim 1, wherein the degradable material of the transient modifier comprises the droplets of the gas.

14. The method of claim 13, wherein the gas is in a form of an energized fluid.

15. The method of claim 13, wherein the gas comprises air, nitrogen, carbon dioxide, or argon.

16. The method of claim 1, wherein the permeability across the siliceous geologic formation is higher than if no precipitation prevention agent and no transient modifier were present in the treatment composition.

17. The method of claim 1, wherein allowing the transient modifier to modify the permeability of the siliceous geologic formation is observed by measuring a permeability contrast of the siliceous geologic formation.

18. The method of claim 1, further comprising adjusting pH of the treatment composition using a mineral acid.

19. The method of claim 1, wherein the transient modifier comprises the droplets of the acid suspended in a hydrophobic fluid, wherein the hydrophobic fluid comprises D-limonene or xylene.

20. The method of claim 1, wherein:
- the treatment composition has a pH of about 2.0;
- the precipitation prevention agent comprises a scale inhibitor present in the treatment composition at a concentration between about 0.1 weight percent and about 2 weight percent, by weight of the treatment composition;
- the scale inhibitor is a phosphonic acid, a phosphoric acid, a phosphonate, a phosphate, a polyacrylamide, a phosphonated polyetheramine, a salt of an acrylamido-methyl propane sulfonate/acrylic acid copolymer, phosphinated maleic copolymer, a salt of a polymaleic acid/acrylic acid/acrylamido-methyl propane sulfonate terpolymer, or a mixture thereof;
- the degradable material of the transient modifier comprises the solid particles;
- the solid particles are present in the treatment composition at a concentration between about 0.5 and about 500 parts-per-thousand;
- the solid particles comprise particles of polylactic acid having a median size between 1 μm and 50 μm with at least 90% of the particles of polylactic acid having a size between 0.3 μm and 500 μm, or particles of butanediol-vinyl alcohol copolymer having a median size between 5 μm and 1000 μm with at least 90% of the particles of butanediol-vinyl alcohol copolymer having a size between 1 μm and 1000 μm;
- the siliceous geologic formation is a sandstone formation having a permeability of 10 mD to 500 mD and a permeability contrast between 1.1 and 10; and
- the method does not include an acid preflush stage.

* * * * *